US012558888B2

(12) United States Patent
Katakura et al.

(10) Patent No.: US 12,558,888 B2
(45) Date of Patent: Feb. 24, 2026

(54) LIQUID EJECTION APPARATUS AND DRIVING METHOD

(71) Applicant: SEIKO EPSON CORPORATION, Tokyo (JP)

(72) Inventors: Takahiro Katakura, Okaya (JP); Toshiro Murayama, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 213 days.

(21) Appl. No.: 18/456,662

(22) Filed: Aug. 28, 2023

(65) Prior Publication Data

US 2024/0066860 A1 Feb. 29, 2024

(30) Foreign Application Priority Data

Aug. 29, 2022 (JP) ................................ 2022-135727

(51) Int. Cl.
*B41J 2/045* (2006.01)
*B41J 2/14* (2006.01)

(52) U.S. Cl.
CPC ....... *B41J 2/04581* (2013.01); *B41J 2/04588* (2013.01); *B41J 2/14233* (2013.01)

(58) Field of Classification Search
CPC ...................................................... B41J 2/0451
See application file for complete search history.

(56) References Cited

U.S. PATENT DOCUMENTS

2008/0030102 A1* 2/2008 Ohnishi ................ B41J 2/0451 310/317
2015/0062219 A1 3/2015 Otokita
2015/0239239 A1 8/2015 Otokita
2017/0057225 A1* 3/2017 Kamiyanagi ........ B41J 2/04588
2018/0257371 A1* 9/2018 Shinkawa ................ B41J 29/38
2019/0263113 A1* 8/2019 Shinkawa ............ B41J 2/04541
2020/0094547 A1* 3/2020 Saito .................... B41J 2/04551
2022/0314614 A1* 10/2022 Shinkawa ............ B41J 2/04588

FOREIGN PATENT DOCUMENTS

JP 2011-140244 A 7/2011
JP 2015-047737 A 3/2015
JP 2015-160354 A 9/2015
JP 2017-047529 A 3/2017

* cited by examiner

*Primary Examiner* — Shelby L Fidler

(74) *Attorney, Agent, or Firm* — WORKMAN NYDEGGER

(57) ABSTRACT

A liquid ejection apparatus includes an ejection unit including a nozzle, a pressure chamber, and a piezoelectric element that applies pressure fluctuations to a liquid in the pressure chamber according to a supplied drive signal, a drive signal generation unit that generates the drive signal, and a detection unit that detects a residual vibration generated in the pressure chamber. The drive signal generation unit generates the drive signal having a detection waveform including an expansion element that changes in potential from a first potential to a second potential to expand the pressure chamber, and an expansion potential maintaining element that maintains the second potential following the expansion element. A length of a period from a start to an end of a change in potential from the first potential to the second potential is equal to or greater than a length of a natural vibration cycle of the ejection unit.

10 Claims, 14 Drawing Sheets

FIG. 9

| Sd[k] | DESIGNATED CONTENT OF Sd[k] | SLa[k] | SLb[k] | | | SLs[k] | | |
|---|---|---|---|---|---|---|---|---|
| | | | TSS1 | TSS2 | TSS3 | TSS1 | TSS2 | TSS3 |
| (1, 0) | EJECTION | H | L | L | L | L | L | L |
| (0, 0) | NO DOTS RECORDED | L | L | L | L | L | L | L |
| (1, 1) | DETECTION TARGET | L | H | L | H | L | H | L |

LIQUID EJECTION APPARATUS AND DRIVING METHOD

The present application is based on, and claims priority from JP Application Serial Number 2022-135727, filed Aug. 29, 2022, the disclosure of which is hereby incorporated by reference herein in its entirety.

BACKGROUND

1. Technical Field

The present disclosure relates to a liquid ejection apparatus and a driving method.

2. Related Art

In the related art, a liquid ejection apparatus including an ejection unit including a nozzle from which a liquid is ejected, a pressure chamber communicating with the nozzle, and a piezoelectric element that applies pressure fluctuations to a liquid in the pressure chamber according to a drive signal are provided, where the liquid ejection apparatus ejects the liquid from the nozzle onto a medium to form an image on a medium, is disclosed. For example, the liquid ejection apparatus has a problem of thickening of the liquid due to evaporation and the like of moisture contained in the liquid. In order to estimate the viscosity of a liquid, for example, JP-A-2017-47529 discloses a liquid ejection apparatus that determines the ejection state of a liquid in an ejection unit based on a residual vibration generated in a pressure chamber after a piezoelectric element applies pressure fluctuations to a liquid in the pressure chamber to prevent image quality from deteriorating due to an ejection abnormality.

However, when the liquid surface of the nozzle is greatly vibrated in order to accurately measure the residual vibration, there are cases where an ejection abnormality occurs after the residual vibration occurs.

SUMMARY

According to an aspect of the present disclosure, a liquid ejection apparatus includes an ejection unit including a nozzle from which a liquid is ejected, a pressure chamber communicating with the nozzle, and a piezoelectric element that applies pressure fluctuations to a liquid in the pressure chamber according to a supplied drive signal, a drive signal generation unit that generates the drive signal, and a detection unit that detects a residual vibration generated in the pressure chamber after the piezoelectric element applies pressure fluctuations to the liquid in the pressure chamber, wherein the drive signal generation unit generates the drive signal having a detection waveform including an expansion element that changes in potential from a first potential to a second potential to expand the pressure chamber, and an expansion potential maintaining element that maintains the second potential following the expansion element, wherein a length of a period from a start to an end of a change in potential from the first potential to the second potential is equal to or greater than a length of a natural vibration cycle of the ejection unit, and wherein the detection unit detects a residual vibration generated in the pressure chamber during a detection period included in a period of the expansion potential maintaining element.

According to another aspect of the present disclosure, in a method of driving a liquid ejection apparatus including an ejection unit including a nozzle from which a liquid is ejected, a pressure chamber communicating with the nozzle, and a piezoelectric element that applies pressure fluctuations to a liquid in the pressure chamber according to a supplied drive signal, a drive signal generation unit that generates the drive signal, and a detection unit that detects a residual vibration generated in the pressure chamber after the piezoelectric element applies pressure fluctuations to the liquid in the pressure chamber, the drive signal generation unit generates the drive signal having a detection waveform including an expansion element that changes in potential from a first potential to a second potential to expand the pressure chamber, and an expansion potential maintaining element that maintains the second potential following the expansion element, the detection unit detects a residual vibration generated in the pressure chamber during a detection period included in a period of the expansion potential maintaining element, wherein after the expansion element is supplied the piezoelectric element, a liquid surface in the nozzle vibrates according to a natural vibration cycle of the ejection unit, and the liquid surface in the nozzle vibrates in the nozzle until a period twice the natural vibration cycle elapses since an end of the expansion element.

BRIEF DESCRIPTION OF THE DRAWINGS

FIG. 9 is an explanatory diagram for explaining generation of coupling state designation signals SLa[k], SLb[k], and SLs[k].

DESCRIPTION OF EMBODIMENTS

Hereinafter, embodiments for carrying out the present disclosure will be described with reference to the drawings.

However, in each figure, the size and scale of each part are appropriately changed from the actual ones. In addition, since the embodiments described below are preferable specific examples of the present disclosure, there are various technically preferred limitations. However, the scope of the present disclosure is not limited to these embodiments unless otherwise specified in the following description.

1. First Embodiment

In the present embodiment, a liquid ejection apparatus will be described by exemplifying an ink jet printer 1 that ejects ink to form an image on recording paper PP. The ink jet printer 1 is an example of a "liquid ejection apparatus". The ink is an example of a "liquid". The recording paper PP is an example of a "medium".

1-1. Outline of Ink Jet Printer 1

Figure 1:
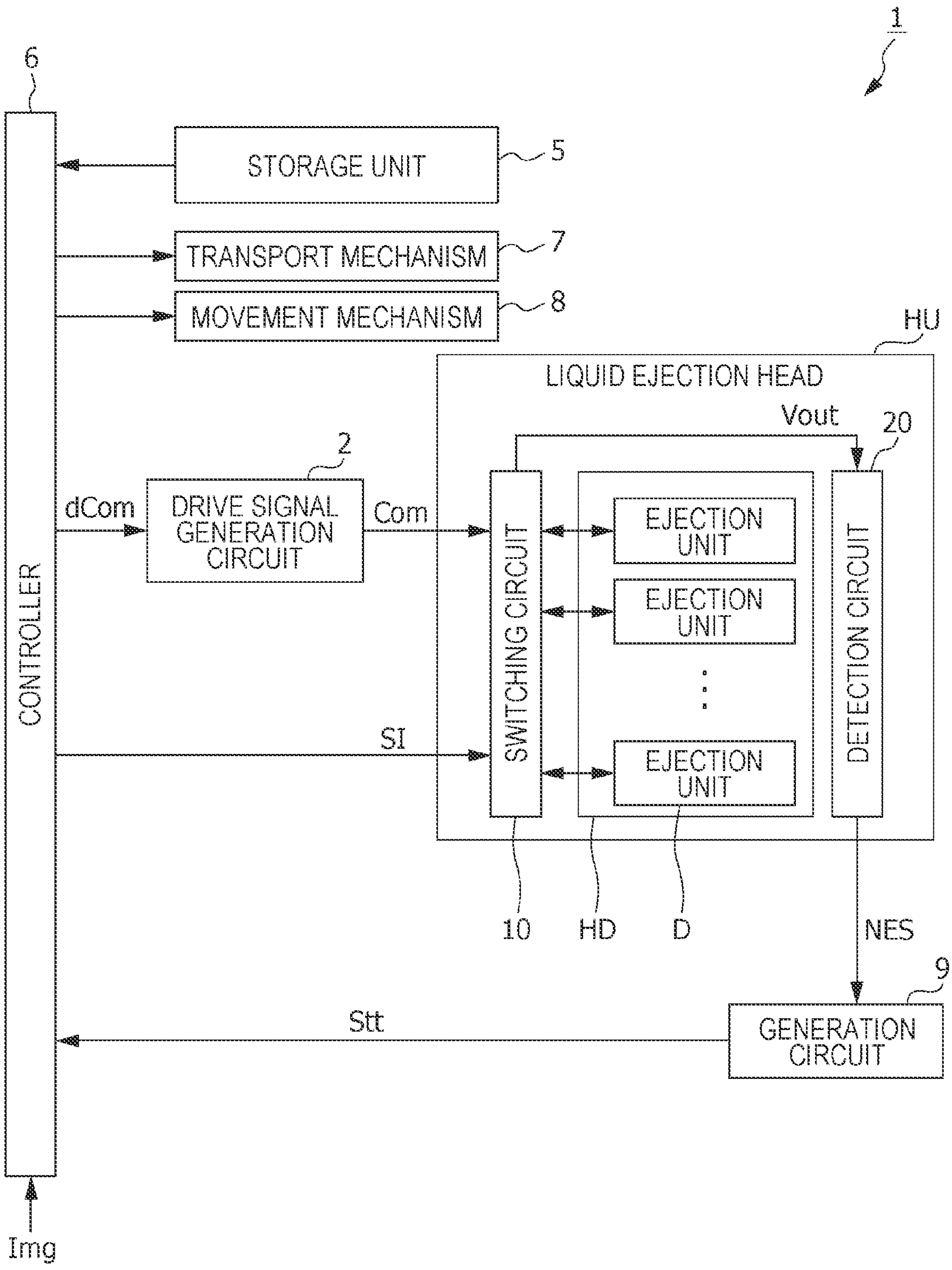
FIG. 1 is a functional block diagram showing an example of the configuration of an ink jet printer according to the present embodiment.
Figure 2:
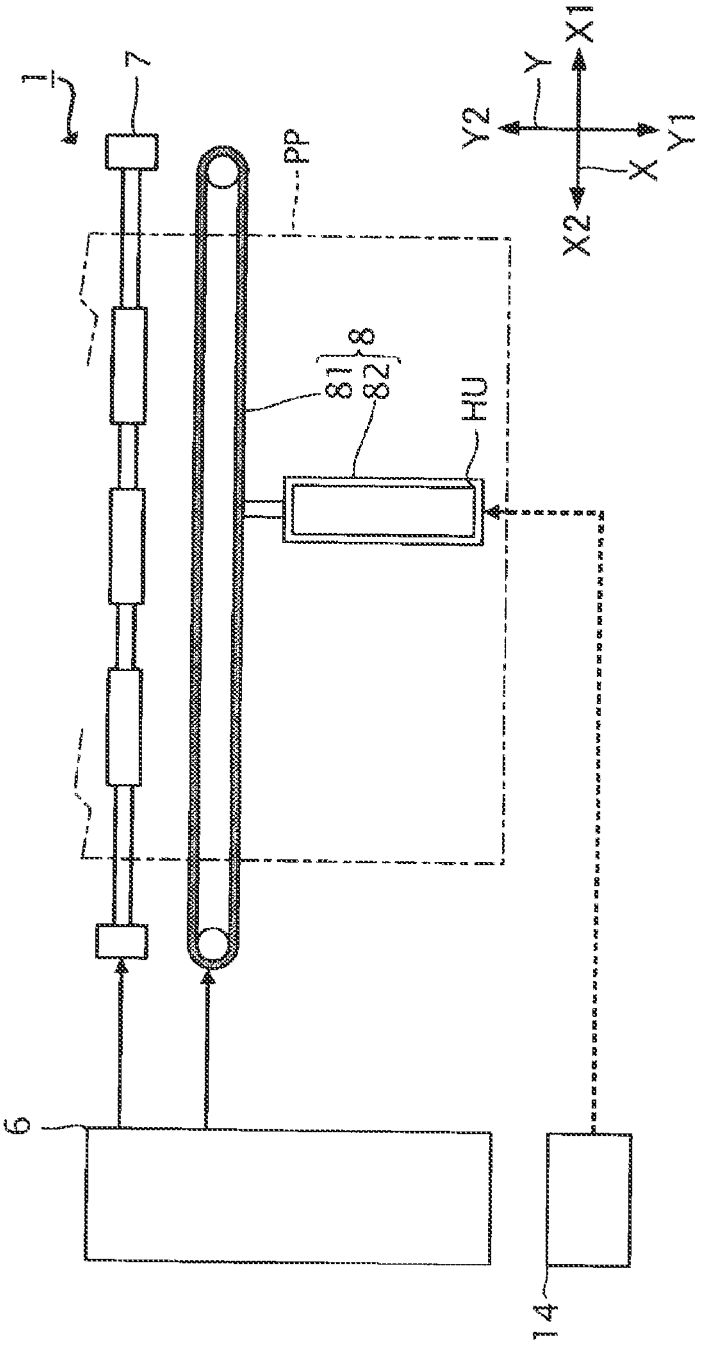
FIG. 2 is a schematic diagram illustrating the ink jet printer.

The configuration of the ink jet printer 1 according to the present embodiment will be described with reference to FIGS. 1 and 2. Here, FIG. 1 is a functional block diagram showing an example of the configuration of the ink jet printer 1 according to the present embodiment. Further, FIG. 2 is a schematic diagram illustrating the ink jet printer 1.

The ink jet printer 1 is supplied with print data Img indicating an image to be formed by the ink jet printer 1 and information indicating the number of copies of the image to be formed by the ink jet printer 1 from a host computer such as a personal computer or a digital camera. The ink jet printer 1 performs a printing process of forming an image indicated by the print data Img supplied from the host computer on the recording paper PP.

As exemplified in FIG. 1, the ink jet printer 1 includes a liquid ejection head HU including an ejection unit D from which ink is ejected, a controller 6 that controls the operation of each portion of the ink jet printer 1, a drive signal generation circuit 2 that generates a drive signal Com for driving the ejection unit D, a storage unit 5 that stores a control program for the ink jet printer 1 and other information, a generation circuit 9 that generates ejection information Stt indicating the detection result of the residual vibration generated in the ejection unit D, a transport mechanism 7 that transports the recording paper PP, and a movement mechanism 8 that moves the liquid ejection head HU. Note that the drive signal generation circuit 2 is an example of a "drive signal generation unit".

In the present embodiment, the liquid ejection head HU includes a recording head HD having K ejection units D, a switching circuit 10 and a detection circuit 20. In the present embodiment, K is an integer of two or more. However, K may be one. Note that the detection circuit 20 is an example of a "detection unit".

In the following, the K ejection units D provided in the recording head HD may be referred to as a first ejection unit, a second ejection unit, . . . , a K-th ejection unit in order to distinguish each of them. Also, the k-th ejection unit D may be referred to as an ejection unit D[k]. The variable k is an integer satisfying one or more and k or less. In addition, when the component, the signal, and the like of the ink jet printer 1 corresponds to the ejection unit D[k], the code for representing the component, the signal, and the like may have a subscript [k] indicating that the code corresponds to the ejection unit D[k].

The switching circuit 10 switches whether to supply the drive signal Com output from the drive signal generation circuit 2 to each ejection unit D. Further, the switching circuit 10 switches whether to electrically couple each ejection unit D and the detection circuit 20.

The detection circuit 20 generates a residual vibration signal NES[k] which indicates the residual vibration generated in a pressure chamber 320, which will be described later, of the ejection unit D[k] after the ejection unit D[k] is driven based on a detection signal Vout[k] detected from the ejection unit D[k] driven by the drive signal Com for any k from 1 to K.

The generation circuit 9 generates ejection information Stt[k] indicating the detection result of the residual vibration based on the residual vibration signal NES[k] for any k from 1 to K. For example, the ejection information Stt[k] is one or more of a value indicating the magnitude of the amplitude of the residual vibration, a value indicating the cycle of the residual vibration, and a damping ratio of the residual vibration. It should be noted that, hereinafter, the ejection unit D subject to detection of the residual vibration by the generation circuit 9 may be referred to as a detection target ejection unit D-H. Further, a series of processes, performed by the ink jet printer 1, including generation of the ejection information Stt[k] performed by the generation circuit 9 and a preparatory process for the generation circuit 9 to generate the ejection information Stt[k] is referred to as an ejection information generation process.

In the present embodiment, it is assumed that the ink jet printer 1 is a serial printer. Specifically, as shown in FIG. 2, the ink jet printer 1 performs the printing process by ejecting ink from the ejection unit D while transporting the recording paper PP in the sub-scanning direction and moving the liquid ejection head HU in the main scanning direction. In the present embodiment, as shown in FIG. 2, an X1 direction and an X2 direction opposite to the X1 direction are the main scanning directions, and a Y1 direction is the sub-scanning direction. Further, the direction that is perpendicular to the X axis direction and the Y axis direction and in which the ink is ejected is referred to as a Z1 direction.

The recording head HD and the ejection unit D provided in the recording head HD will be described with reference to FIG. 3.

Figure 3:
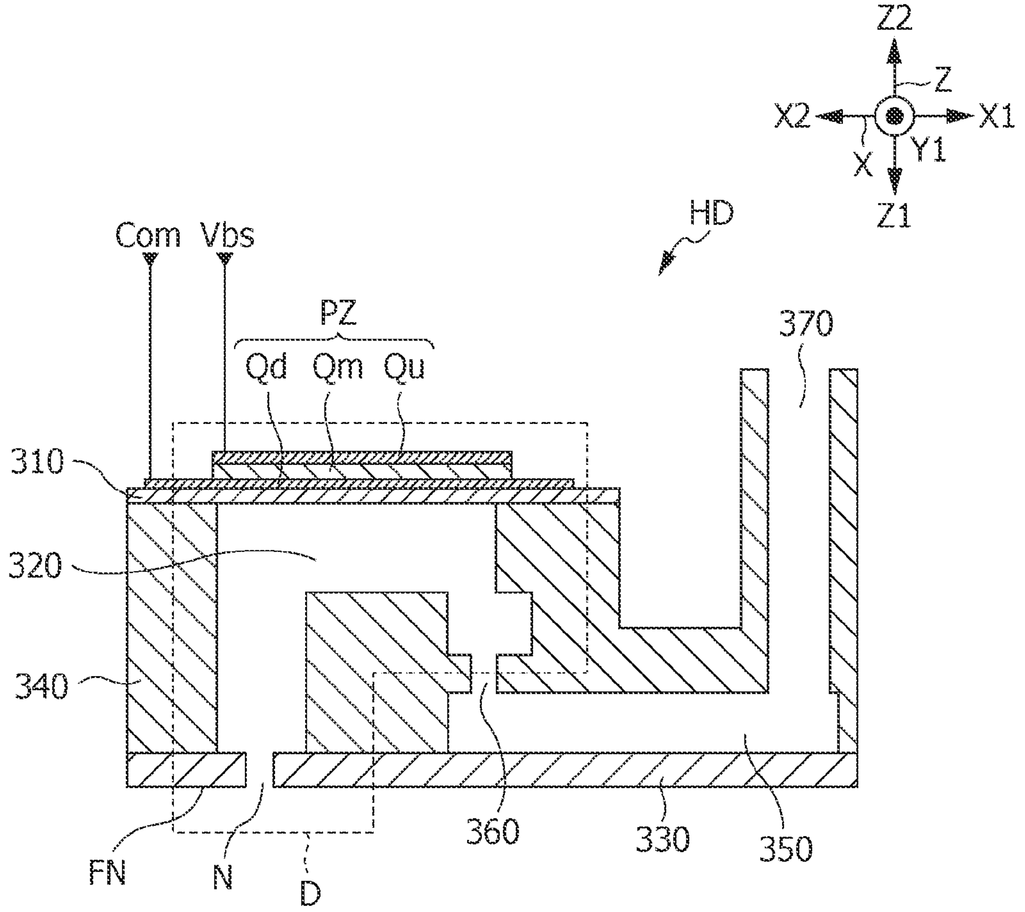
FIG. 3 is a schematic partial cross-sectional view of a recording head in which the recording head is cut so as to include an ejection unit.

FIG. 3 is a schematic partial cross-sectional view of the recording head HD in which the recording head HD is cut so as to include the ejection unit D. As shown in FIG. 3, the ejection unit D includes a piezoelectric element PZ, the pressure chamber 320 in which the ink is stored, a nozzle N communicating with the pressure chamber 320, and a vibration plate 310. The ejection unit D ejects the ink in the pressure chamber 320 from the nozzle N by supplying the drive signal Com to the piezoelectric element PZ and actuating the piezoelectric element PZ by the drive signal Com. The pressure chamber 320 is a space defined by a pressure chamber substrate 340, a nozzle plate 330 having the nozzle N formed therein, and the vibration plate 310. The nozzle N is provided in a nozzle face FN, which is the face, of the nozzle plate 330, facing the Z1 direction.

Pressure chamber 320 communicates with a reservoir 350 via an ink supply port 360. The reservoir 350 communicates with a liquid container 14 corresponding to the ejection unit D via an ink intake port 370.

In the present embodiment, a unimorph type as shown in FIG. 3 is employed as the piezoelectric element PZ. The piezoelectric element PZ is not limited to the unimorph type, and a bimorph type, a laminated type, or the like may be employed.

The piezoelectric element PZ includes a common electrode Qu, an individual electrode Qd, and a piezoelectric body Qm provided between the common electrode Qu and the individual electrode Qd. The common electrode Qu is provided on the face, of the piezoelectric body Qm, facing the Z2 direction. The common electrode Qu is a so-called upper electrode. The individual electrode Qd is provided on the face, of the piezoelectric body Qm, facing the Z1 direction. The individual electrodes Qd are a so-called lower electrode. The piezoelectric element PZ is a passive element that deforms according to the change in potential of the drive signal Com. When a voltage is applied between the common electrode Qu and the individual electrodes Qd by supplying a constant potential signal Vbs to the common electrode Qu and supplying the drive signal Com to the individual electrodes Qd, the piezoelectric body Qm is displaced in a direction orthogonal to a direction along the Z axis according to the applied voltage.

The piezoelectric body Qm is formed of, for example, a perovskite structure crystal film made of a ferroelectric ceramic material exhibiting an electromechanical conversion action, a so-called perovskite-type crystal. Specifically, examples of the material of the piezoelectric body Qm include a ferroelectric piezoelectric material such as lead zirconate titanate, or a material in which a metal oxide such as niobium oxide, nickel oxide or magnesium oxide is added to a ferroelectric piezoelectric material such as lead zirconate titanate. The piezoelectric body Qm can be formed by forming the piezoelectric material described above by a known film forming technique such as sputtering, and baking the piezoelectric material at a high temperature by a known processing technique such as photolithography.

Figure 4:
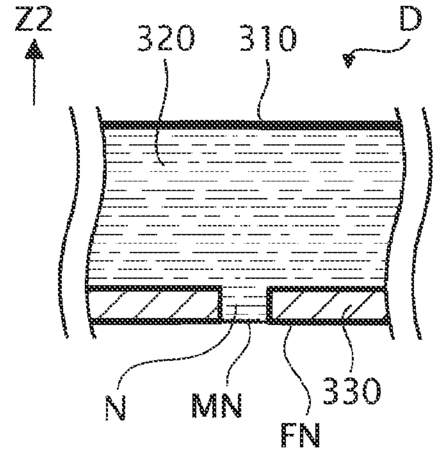
FIG. 4 is an explanatory diagram for explaining an example of an ink ejection operation of the ejection unit.
Figure 5:
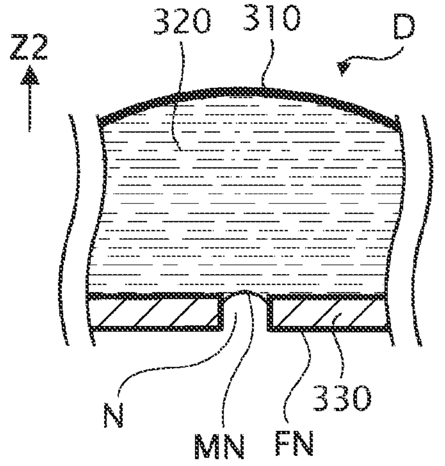
FIG. 5 is an explanatory diagram for explaining an example of an ink ejection operation of the ejection unit.
Figure 6:
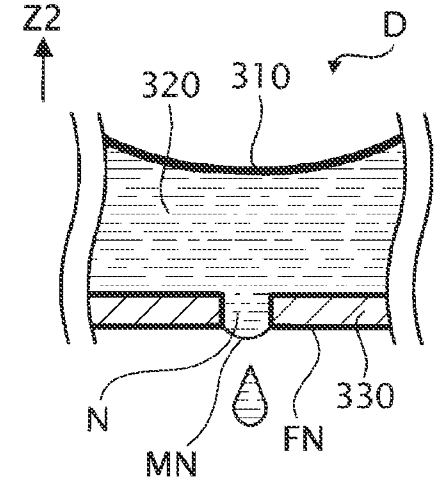
FIG. 6 is an explanatory diagram for explaining an example of an ink ejection operation of the ejection unit.

FIGS. 4, 5, and 6 are explanatory diagrams for explaining an example of the ink ejection operation of the ejection unit D. As illustrated in FIG. 5, by changing the potential of the drive signal Com supplied to the piezoelectric element PZ included in the ejection unit D, the controller 6 causes the piezoelectric element PZ to generate a distortion in which the piezoelectric element PZ is displaced in the Z2 direction to bend the vibration plate 310 of the ejection unit D in the Z2 direction. As a result, as in the state illustrated in FIG. 5, the pressure chamber 320 of the ejection unit D expands, compared with the pressure chamber in the state illustrated in FIG. 4. As shown in FIG. 5, as a result of the expansion of the pressure chamber 320, a meniscus MN, which is the liquid surface of the nozzle N, moves in the Z2 direction.

Next, by changing the potential indicated by the drive signal Com, the controller 6 causes the piezoelectric element PZ to generate a distortion in which the piezoelectric element PZ is displaced in the Z1 direction to bend the vibration plate 310 of the ejection unit D in the Z1 direction. As a result, as in the state illustrated in FIG. 6, the volume of the pressure chamber 320 rapidly contracts, the meniscus MN moves in the Z1 direction, and part of the ink with which the pressure chamber 320 is filled is ejected from the nozzle N that communicates with the pressure chamber 320 as ink droplets. After the piezoelectric element PZ is driven by the drive signal Com, the residual vibration is generated in the ejection unit D.

Returning to FIGS. 1 and 2, description is made. The transport mechanism 7 transports the recording paper PP in the Y1 direction. Specifically, the transport mechanism 7 includes a transport roller (not shown) whose rotation shaft is parallel to a direction along the X axis, and a motor (not shown) that rotates the transport roller under the control of the controller 6.

The movement mechanism 8 reciprocates the liquid ejection head HU along the X axis under the control of the controller 6. As illustrated in FIG. 2, the movement mechanism 8 includes a substantially box-shaped transport body 82 that accommodates the liquid ejection head HU, and an endless belt 81 to which the transport body 82 is fixed.

The storage unit 5 includes a volatile memory such as a RAM and a nonvolatile memory such as ROM, an EEPROM, or a PROM, and stores various pieces of information such as the print data Img supplied from the host computer and a control program of the ink jet printer 1. The RAM is an abbreviation for a random access memory. The ROM is an abbreviation for a read only memory. The EEPROM is an abbreviation for an electrically erasable programmable read-only memory. The PROM is an abbreviation for a programmable ROM.

The controller 6 includes a CPU. The CPU is an abbreviation for a central processing unit. However, the controller 6 may include a programmable logic device such as an FPGA instead of the CPU. The FPGA is an abbreviation for a field programmable gate array.

The CPU provided in the controller 6 operates according to the control program stored in the storage unit 5, so that the ink jet printer 1 performs a printing process.

The controller 6 generates a print signal SI for controlling the liquid ejection head HU, a waveform designation signal dCom for controlling the drive signal generation circuit 2, a signal for controlling the transport mechanism 7, and a signal for controlling the movement mechanism 8. Here, the waveform designation signal dCom is a digital signal that defines the waveform of the drive signal Com. The drive signal Com is an analog signal for driving the ejection unit D. The waveform of the drive signal Com changes in potential as the period elapses. The drive signal generation circuit 2 includes a DA conversion circuit and generates the drive signal Com having a waveform defined by the waveform designation signal dCom. In the present embodiment, it is assumed that the drive signal Com includes a drive signal Com-A and a drive signal Com-B.

Also, the print signal SI is a digital signal for designating the type of operation of the ejection unit D. Specifically, the print signal SI designates the type of operation of the ejection unit D by designating whether to supply the drive signal Com to the ejection unit D. Here, designating the type of operation of the ejection unit D means, for example, designating whether to drive the ejection unit D, or designating whether the ink is ejected from the ejection unit D when the ejection unit D is driven.

When the printing process is performed, the controller 6 first stores the print data Img supplied from the host computer in the storage unit 5. Next, the controller 6 generates various control signals such as the print signal SI, the waveform designation signal dCom, the signal for controlling the transport mechanism 7, and the signal for controlling the movement mechanism 8 based on various pieces of data such as the print data Img stored in the storage unit 5. Based on various control signals and various pieces of data stored in the storage unit 5, the controller 6 cause the transport mechanism 7 and the movement mechanism 8 to change the relative position of the recording paper PP with respect to the liquid ejection head HU while controlling the liquid ejection head HU so that the ejection unit D is driven. As a result, the controller 6 adjusts the presence/absence of ink ejection from the ejection unit D, the ink ejection amount, the ink ejection timing, and the like, and controls the execution of the printing process for forming an image corresponding to the print data Img on the recording paper PP.

In the ejection information generation process, the ink jet printer 1 performs a series of processes of a first process, a second process, a third process, a fourth process, and a fifth process, which are shown below. In the first process, the controller 6 selects the detection target ejection unit D-H from among the K ejection units D provided in the liquid ejection head HU. In the second process, the controller 6 causes the detection target ejection unit D-H to generate a residual vibration by driving the detection target ejection unit D-H. In the third process, the detection circuit 20 generates a residual vibration signal NES based on a detection signal Vout detected from the detection target ejection unit D-H.

In the fourth process, the generation circuit 9 generates the ejection information Stt based on the residual vibration signal NES. In the fifth process, the controller 6 stores the ejection information Stt in the storage unit 5.

1-2. Configuration of Liquid Ejection Head HU

The configuration of the liquid ejection head HU will be described below with reference to FIG. 7.

Figure 7:
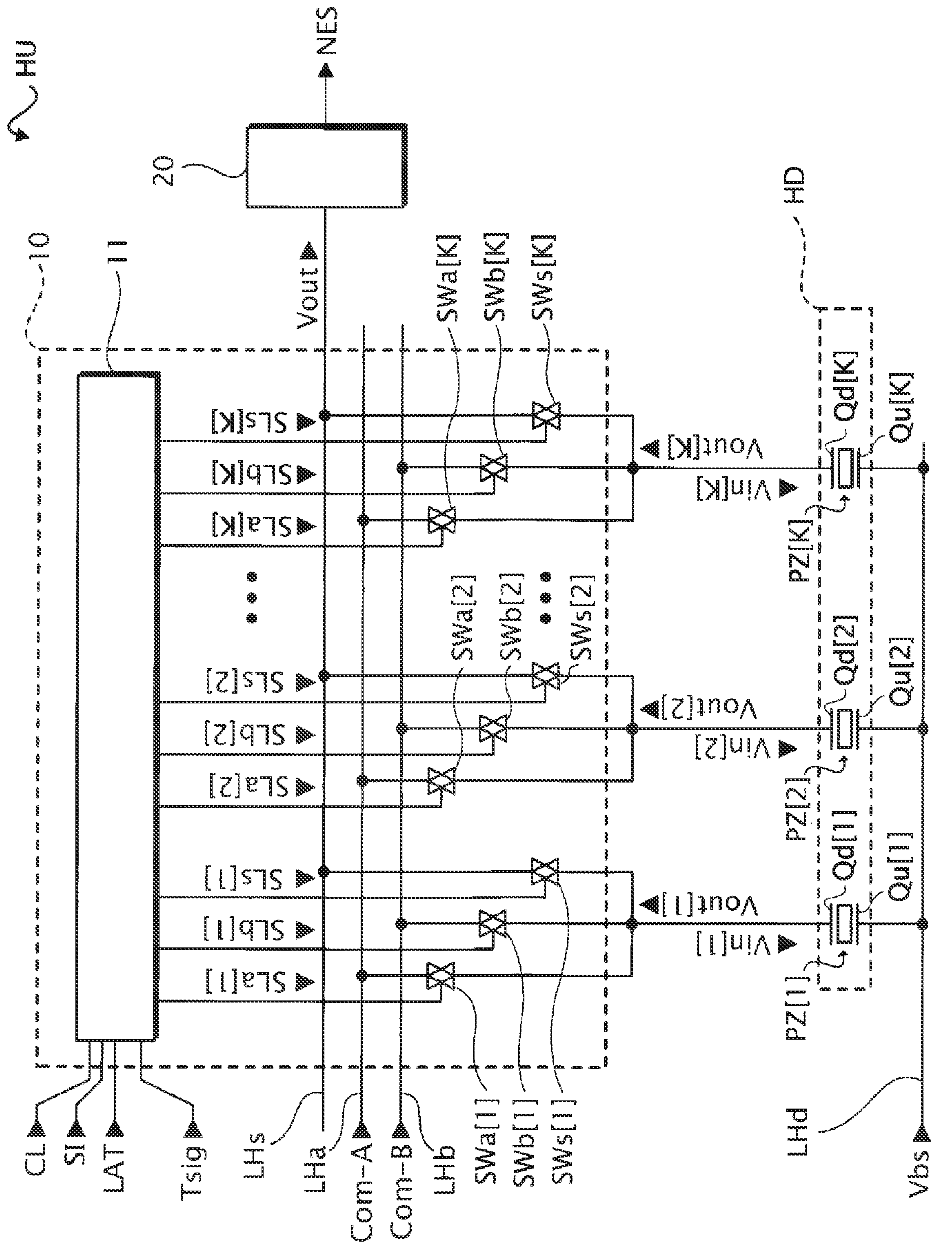
FIG. 7 is a block diagram showing an example of the configuration of a liquid ejection head.

FIG. 7 is a block diagram showing an example of the configuration of the liquid ejection head HU. As described above, the liquid ejection head HU includes the recording head HD, the switching circuit 10, and the detection circuit 20. The liquid ejection head HU also includes an internal wire LHa supplied with the drive signal Com-A from the drive signal generation circuit 2, an internal wire LHb supplied with the drive signal Com-B from the drive signal generation circuit 2, an internal wire LHs for supplying the detection signal Vout detected from the ejection unit D to the detection circuit 20, and an internal wire LHd supplied with the constant potential signal Vbs. The internal wire LHd is electrically coupled to the common electrode Qu.

As shown in FIG. 7, the switching circuit 10 includes k switches SWa[1] to SWa[K], k switches SWb[1] to SWb[K], k switches SWs[1] to SWs[K], and a coupling state designation circuit 11 that designates the coupling state of each switch. As each switch, for example, a transmission gate can be employed. Based on at least part of the print signal SI, a latch signal LAT, and a period designation signal Tsig supplied from the controller 6, the coupling state designation circuit 11 generates coupling state designation signals SLa [1] to SLa[K] for designating on/off of the switches SWa[1] to SWa[K], coupling state designation signals SLb[1] to SLb[K] for designating on/off of the switches SWb[1] to SWb[K], and coupling state designation signals SLs[1] to SLs[K] that designate on/off of the switches SWs[1] to SWs[K]. For any k from 1 to K, the switch SWa[k] switches between conduction and non-conduction between the internal wire LHa and the individual electrodes Qd[k] of a piezoelectric element PZ[k] provided in the ejection unit D[k] according to the coupling state designation signal SLa[k]. For example, the switch SWa[k] is turned on when the coupling state designation signal SLa[k] is at the high level and is turned off when the coupling state designation signal SLa[k] is at the low level. For any k from 1 to K, the switch SWb[k] switches between conduction and non-conduction between the internal wire LHb and the individual electrodes Qd[k] of the piezoelectric element PZ[k] provided in the ejection unit D[k] according to the coupling state designation signal SLb[k]. For example, the switch SWb[k] is turned on when the coupling state designation signal SLb[k] is at the high level and is turned off when the coupling state designation signal SLb[k] is at the low level. For any k from 1 to K, the switch SWs[k] switches between conduction and non-conduction between the internal wire LHs and the individual electrodes Qd[k] of the piezoelectric element PZ[k] provided in the ejection unit D[k] according to the coupling state designation signal SLs[k]. For example, the switch SWs[k] is turned on when the coupling state designation signal SLs[k] is at the high level and is turned off when the coupling state designation signal SLs[k] is at the low level.

The detection signal Vout[k] output from the piezoelectric element PZ[k] of the ejection unit D[k] actuated as the detection target ejection unit D-H is supplied to the detection circuit 20 via the internal wire LHs. Then, the detection circuit 20 generates the residual vibration signal NES based on the detection signal Vout[k].

1-3. Operation of Liquid Ejection Head HU

The operation of the liquid ejection head HU will be described below with reference to FIGS. 8 and 9.

In the present embodiment, the operating period of the ink jet printer 1 includes one or more unit control periods Tu. It is assumed that the ink jet printer 1 according to the present embodiment performs one of actuation of each ejection unit D in the printing process, and actuation and detection of the residual vibration of the detection target ejection unit D-H in the preparatory process in the ejection information generation process in each unit control period Tu. However, the present disclosure is not limited to such an embodiment, and the ink jet printer 1 may perform both actuation of each ejection unit D in the printing process, and actuation and detection of the residual vibration of the detection target ejection unit D-H in the preparatory process in the ejection information generation process in each unit control period Tu. In general, the ink jet printer 1 repeats the printing process over a plurality of continuous or intermittent unit control periods Tu to eject the ink from each ejection unit D one or more times to form an image indicated by the print data Img.

Figure 8:
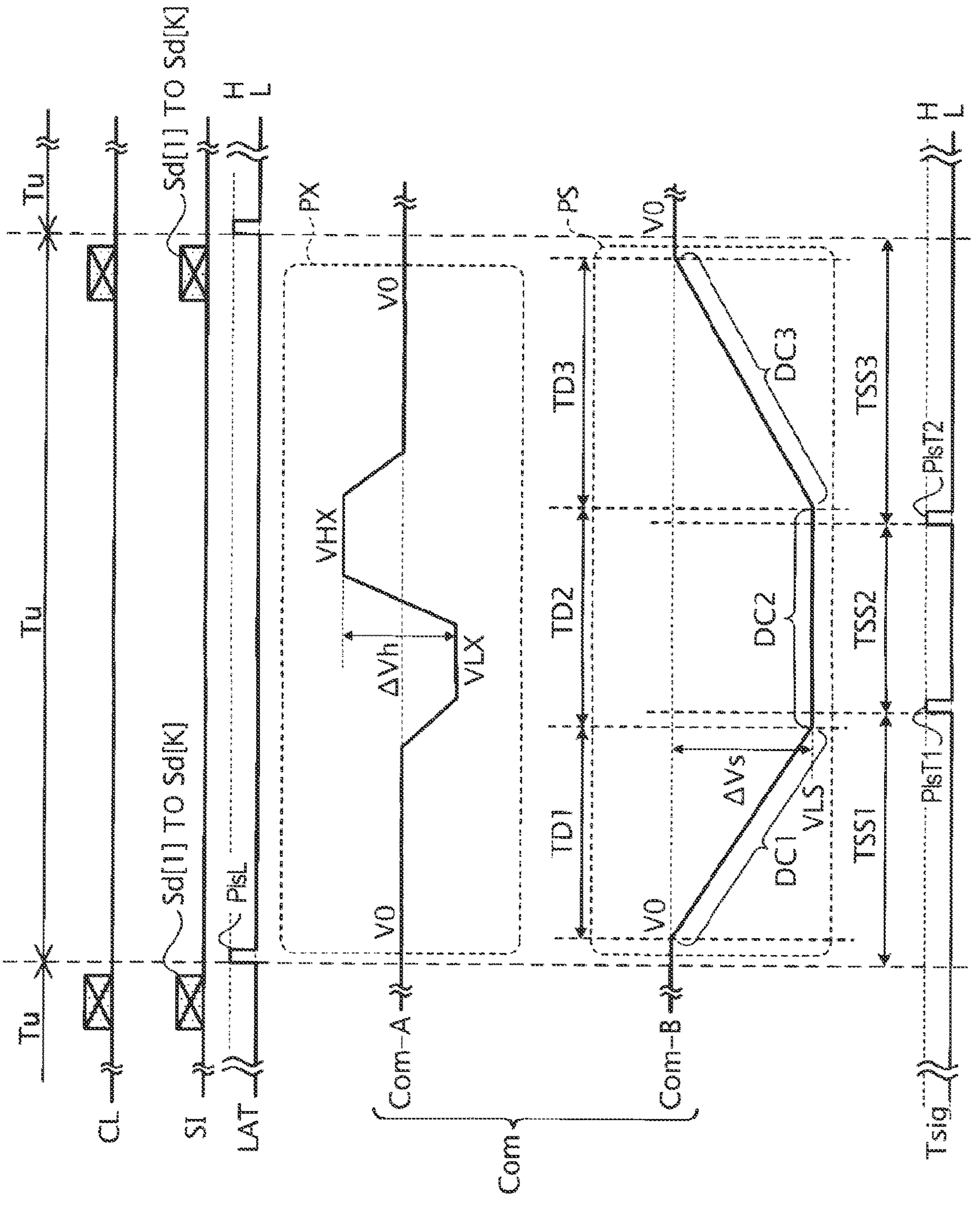
FIG. 8 is a diagram showing a timing chart for explaining the operation of the ink jet printer in a unit control period Tu.

FIG. 8 is a timing chart for explaining the operation of the ink jet printer 1 in the unit control period Tu. As shown in FIG. 8, the controller 6 outputs the latch signal LAT having a pulse PlsL. As a result, the controller 6 defines the unit control period Tu as the period from the rise of the pulse PlsL to the rise of the next pulse PlsL. The print signal SI includes individual designation signals Sd[1] to Sd[K] for designating the actuation mode of the ejection units D[1] to D[K] in each unit control period Tu. Then, when at least one of the printing process and the ejection information generation process is performed in the unit control period Tu, the controller 6 supplies the print signal SI including the individual designation signals Sd[1] to Sd[K] prior to the start of the unit control period Tu to the coupling state designation circuit 11 in synchronization with a clock signal CL as shown in FIG. 8. In this case, the coupling state designation circuit 11 generates coupling state designation signals SLa [k], SLb[k] and SLs[k] based on the individual designation signal Sd[k] in the unit control period Tu for any k from 1 to K.

It should be noted that the individual designation signal Sd[k] according to the present embodiment is a signal that designates any one of the three drive modes of the ink ejection, the ink non-ejection, and the actuation for detection in the ejection information generation process] for the ejection unit D[k] during each unit control period Tu.

As shown in FIG. 8, the drive signal generation circuit 2 outputs the drive signal Com-A having an ejection waveform PX provided in the unit control period Tu. The ejection waveform PX includes an element that maintains an intermediate potential V0, an element that lowers the potential from the intermediate potential V0 to a lowest potential VLX, an element that maintains the lowest potential VLX, and an element that increases the potential from the lowest potential VLX to a highest potential VHX, an element that maintains the highest potential VHX, and an element that lowers the potential from the highest potential VHX to the intermediate potential V0. The amplitude of the potential of the ejection waveform PX is a potential difference ΔVh from the lowest potential VLX to the highest potential VHX. The potential difference ΔVh is the absolute value of the value obtained by subtracting the lowest potential VLX from the highest potential VHX. Note that the drive signal Com-A is an example of a "drive signal having an ejection waveform". The highest potential VHX is an example of a "fourth potential". The lowest potential VLX is an example of a "fifth potential".

Then, for any k from 1 to K, when the individual designation signal Sd[k] designates the ejection unit D[k] to eject the ink, the coupling state designation circuit 11 sets the coupling state designation signal SLa[k] to a high level during the unit control period Tu, and sets the coupling state designation signals SLb[k] and SLs[k] to a low level during the unit control period Tu. As a result, the ejection unit D[k] ejects the ink in the unit control period Tu, and dots are formed on the recording paper PP. Further, when the individual designation signal Sd[k] designates the ejection unit D[k] not to eject the ink, the coupling state designation circuit 11 sets the coupling state designation signals SLa[k], SLb[k], and SLs[k] to a low level during the unit control period Tu. In this case, the ejection unit D[k] does not eject the ink and does not form dots on the recording paper PP during the unit control period Tu.

As shown in FIG. 8, the drive signal generation circuit 2 outputs the drive signal Com-B having a detection waveform PS provided in the unit control period Tu. The detection waveform PS includes an expansion element DC1 that changes in potential from the intermediate potential V0 to an expansion potential VLS to expand the pressure chamber 320, an expansion potential maintaining element DC2 that maintains the expansion potential VLS following the expansion element DC1, and a restoring element DC3 that changes in potential from the expansion potential VLS to the intermediate potential V0 following the expansion potential maintaining element DC2. As shown in FIG. 8, the expansion potential VLS is lower than the intermediate potential V0. The amplitude of the potential of the detection waveform PS is a potential difference ΔVs from the expansion potential VLS to the intermediate potential V0. The potential difference ΔVs is the absolute value of the value obtained by subtracting the expansion potential VLS from the intermediate potential V0. The drive signal Com-B is an example of a "drive signal having a detection waveform". The intermediate potential V0 is an example of a "first potential" and a "third potential". The expansion potential VLS is an example of a "second potential".

The controller 6 also outputs the period designation signal Tsig having a pulse PlsT1 and a pulse PlsT2. As a result, the controller 6 divides the unit control period Tu into a control period TSS1 from the start of the pulse PlsL to the start of the pulse PlsT1, a control period TSS2 from the start of the pulse PlsT1 to the start of the pulse PlsT2, and a control period TSS3 from the start of the pulse PlsT2 to the start of the next pulse PlsL. As shown in FIG. 8, the control period TSS1 includes a period TD1 of the expansion element DC1, and the control period TSS3 includes a period TD3 of the restoring element DC3. The control period TSS2 is included in a period TD2 of the expansion potential maintaining element DC2. Note that the control period TSS2 is an example of a "detection period".

When the individual designation signal Sd[k] designates the ejection unit D[k] as the detection target ejection unit D-H, the coupling state designation circuit 11 sets the coupling state designation signal SLa[k] to a low level during the unit control period Tu, sets the coupling state designation signal SLb[k] to a high level during the control periods TSS1 and TSS3 and sets the coupling state designation signal SLb[k] to a low level during the control period TSS2, and sets the coupling state designation signal SLs[k] to a low level during the control periods TSS1 and TSS3 and sets the coupling state designation signal SLs[k] to a high level during the control period TSS2. In this case, the detection target ejection unit D-H is driven by the drive signal Com-B of the detection waveform PS during the control period TSS1. Specifically, the piezoelectric element PZ of the detection target ejection unit D-H is displaced by the drive signal Com-B of the detection waveform PS during the control period TSS1. As a result, the vibration occurs in the detection target ejection unit D-H, and this vibration remains even during the control period TSS2. Then, in the control period TSS2, the individual electrode Qd of the piezoelectric element PZ of the detection target ejection unit D-H changes its potential according to the residual vibration occurring in the detection target ejection unit D-H. In other words, during the control period TSS2, the individual electrode Qd of the piezoelectric element PZ of the detection target ejection unit D-H indicates a potential corresponding the electromotive force of the piezoelectric element PZ caused by the residual vibration occurring in the detection target ejection unit D-H. Then, the potential of the individual electrode Qd can be detected as the detection signal Vout during the control period TSS2.

It is assumed that the waveform is such that the ink is not ejected when the detection target ejection unit D-H is driven by the detection waveform PS that generates the residual vibration. By not ejecting the ink, the consumption of the ink can be reduced.

FIG. 9 is an explanatory diagram for explaining the generation of the coupling state designation signals SLa[k], SLb[k], and SLs[k] for any k from 1 to K. The coupling state designation circuit 11 decodes the individual designation signal Sd[k] and generates the coupling state designation signals SLa[k], SLb[k], and SLs[k] according to FIG. 9. As shown in FIG. 9, the individual designation signal Sd[k] according to the present embodiment indicates any one of a value (1, 0) designating the ink ejection, a value (0, 0) designating non-ejection of ink, or a value (1, 1) that designates actuation as the detection target ejection unit D-H. Then, the coupling state designation circuit 11 sets the coupling state designation signal SLa[k] to a high level during the unit control period Tu when the individual designation signal Sd[k] indicates (1, 0), sets the coupling state designation signal SLb[k] to a high level during the control periods TSS1 and TSS3, and set the coupling state designation signal SLs[k] to a high level during the control period TSS2 when the individual designation signal Sd[k] indicates (1, 1), and sets each signal to a low level when the individual designation signal Sd[k] indicates none of the above.

The detection circuit 20 generates the residual vibration signal NES based on the detection signal Vout, as described above. The residual vibration signal NES is a signal obtained by shaping the detection signal Vout into a waveform suitable for processing in the generation circuit 9 by, for example, amplifying the amplitude of the detection signal Vout and removing noise components from the detection signal Vout. The detection circuit 20 may include, for example, a negative feedback type amplifier that amplifies the detection signal Vout, a low-pass filter that attenuates the high frequency component of the detection signal Vout, and a voltage follower that converts impedance to output the residual vibration signal NES of low impedance.

1-4. Residual Vibration

By increasing the amplitude of the residual vibration, the noise can be made relatively small with respect to the potential of the individual electrode Qd indicating the residual vibration, so that the measurement accuracy of the residual vibration can be improved. However, it has been found from experiments by the inventors that in a case where the residual vibration is detected, when the piezoelectric element PZ is driven to such an extent that the ink is not ejected while ensuring the amplitude of the residual vibration to some extent in order to reduce ink consumption, an ejection abnormality may occur. The reason why the ejection abnormality occurs will be described with reference to FIGS. 10 and 11.

Figure 10:
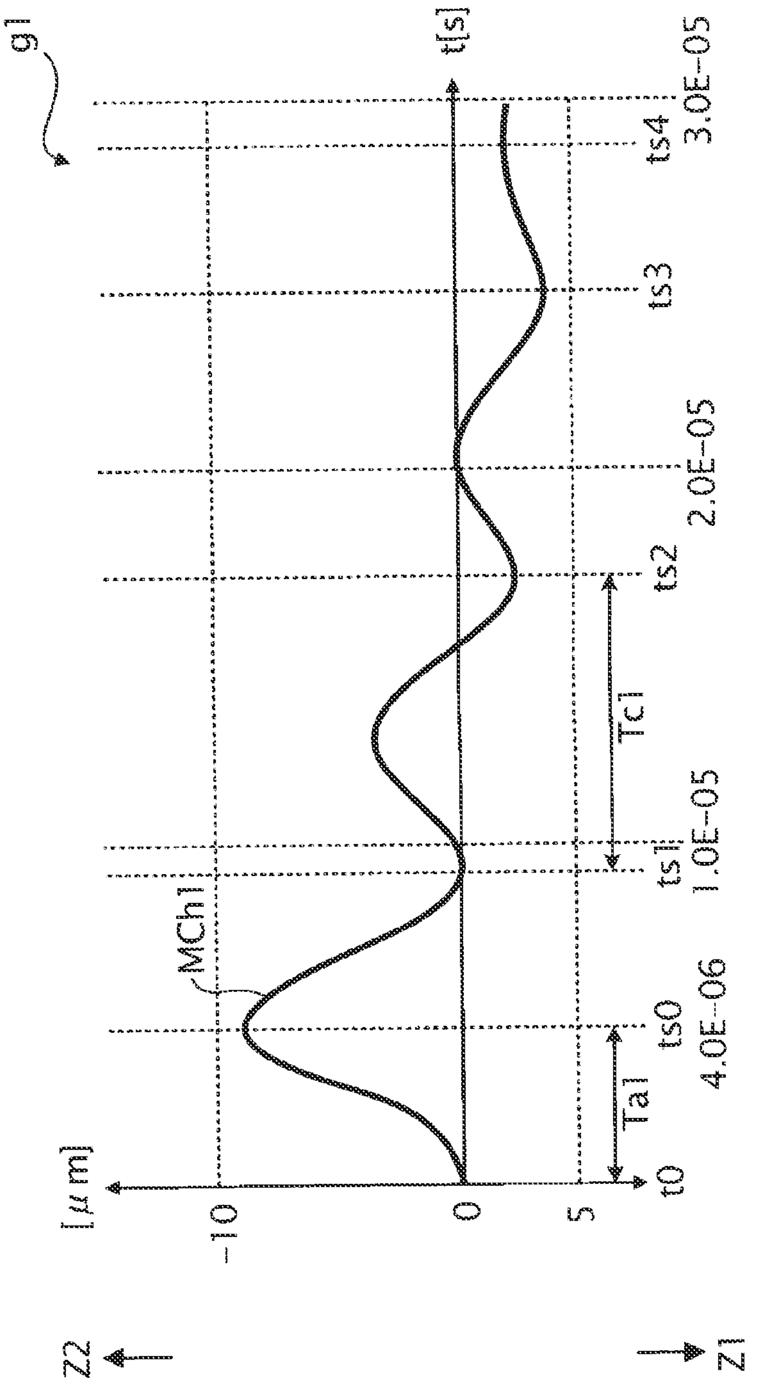
FIG. 10 is a diagram for explaining the vibration of a meniscus when a pressure chamber is rapidly expanded.

FIG. 10 is a diagram for explaining the vibration of the meniscus MN when the pressure chamber 320 is rapidly expanded in order to secure the amplitude of the residual vibration. The horizontal axis of a graph g1 shown in FIG. 10 indicates the elapsed time from time to at which pressure chamber 320 begins to expand rapidly. In the present embodiment, to expand the pressure chamber 320 rapidly means to expand the pressure chamber 320 in a period shorter than a natural vibration cycle Tc of the ejection unit D. In other words, the length of the period TD1 of the expansion element DC1 of the detection waveform PS is shorter than the natural vibration cycle Tc. Time t0 is the start time of the period TD1. The vertical axis of the graph g1 indicates the position of the meniscus MN along the Z axis. Hereinafter, to simplify the description, the position of the meniscus MN in the direction along the Z axis may be simply referred to as the position of the meniscus MN. The position of the meniscus MN means the position of the ink surface corresponding to the center of gravity of the nozzle N when viewed along the Z axis. In the vertical axis of the graph g1 and the vertical axis of a graph g2 shown in FIG. 13 described later, the position of the nozzle face FN in the direction along the Z axis is 0, and the position in the Z1 direction relative to the nozzle face FN is indicated a positive value, and the position in the Z2 direction relative to the nozzle face FN is indicated as a negative value.

A meniscus characteristic MCh1 shown in the graph g1 indicates the vibration characteristic of the meniscus MN when the pressure chamber 320 is rapidly expanded. As indicated by the meniscus characteristic MCh1, the meniscus MN is pulled in the Z2 direction during a period Ta1. The period Ta1 is a period from time t0 to time ts0. Time ts0 is approximately 4.0 microseconds. The period Ta1 is approximately half a natural vibration cycle Tc. The position of the meniscus MN at time ts0 is a position about 9.1 [μm] away from the nozzle face FN in the Z2 direction. [μm] means micrometer.

After the elapse of the period Ta1, the meniscus MN moves in the Z1 direction due to the recoil from the position at which the meniscus MN is pulled in the Z2 direction. As indicated by the meniscus characteristic MCh1, the meniscus MN attenuates while vibrating according to the natural vibration cycle Tc. For example, the length of a period Tc1 from time ts1 one cycle after time t0 to time ts2 two cycles after time t0 is substantially the same as the length of the natural vibration cycle Tc. The position of the meniscus MN at time ts1 is substantially the same as the position of the nozzle face FN. The position of the meniscus MN at time ts2 is a position about 2.3 [μm] away from the nozzle face FN in the Z1 direction. The position of the meniscus MN at time ts3, three cycles after time t0, is a position about 3.1 [μm] away from the nozzle face FN in the Z1 direction. As indicated by the meniscus characteristic MCh1, time ts3 is the time when the meniscus MN protrudes most in the Z1 direction relative to the nozzle face FN.

As indicated by the meniscus characteristic MCh1, the meniscus MN protrudes in the Z1 direction from the nozzle face FN at time ts2 after a period about twice the natural vibration cycle Tc has elapsed from time to. Therefore, in the example of FIG. 10, the meniscus MN vibrates inside and outside the nozzle N until a period twice the natural vibration cycle Tc has elapsed since the end of the expansion element DC1.

Figure 11:
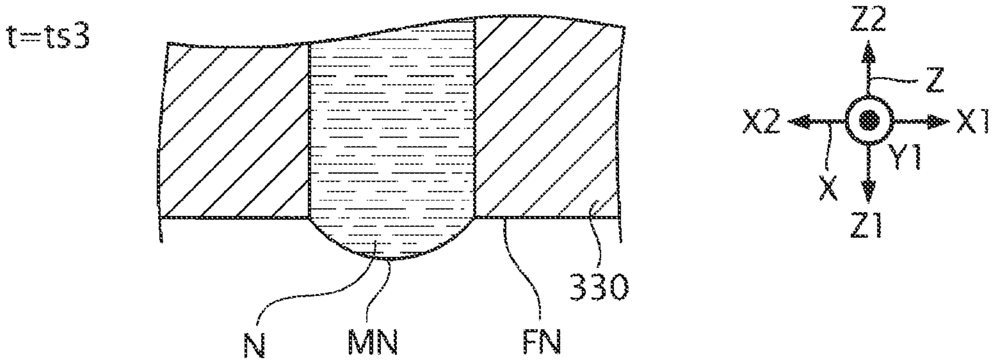
FIG. 11 is a diagram showing the state of the meniscus at time ts3.
Figure 12:
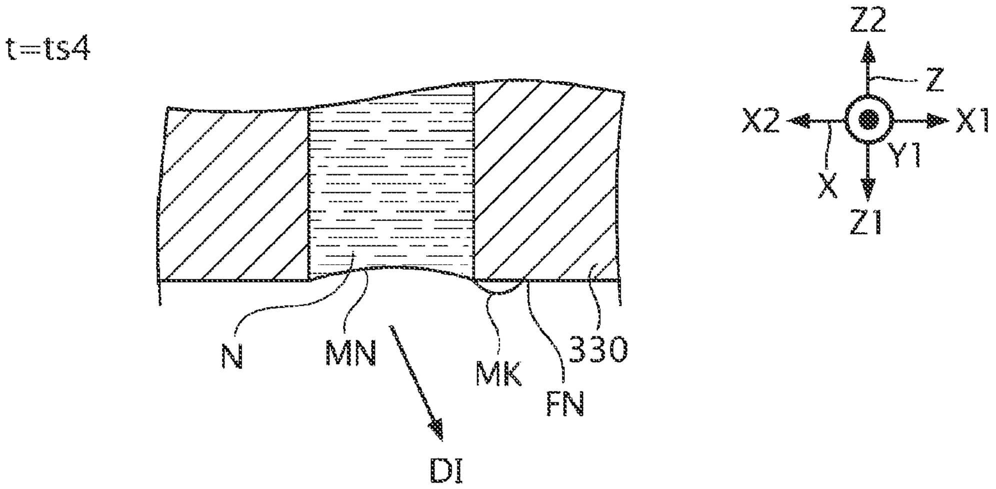
FIG. 12 is a diagram showing the state of the meniscus at time ts4.

FIG. 11 is a diagram showing the state of the meniscus MN at time ts3. FIG. 12 shows the state of the meniscus MN at time ts4 after time ts3. When the meniscus MN returns in the Z2 direction from the state in which the meniscus MN protrudes from the nozzle face FN in the Z1 direction, a small amount of ink may remain on the edge of the nozzle N. In the example of FIG. 12, an ink MK is attached to the edge of the nozzle N in the X1 direction. When the ink is ejected in a state where the ink is attached to the edge of the nozzle N, the ink droplet may be pulled by the ink attached to the edge of the nozzle N, and the ejection direction may deviate from the Z1 direction. Alternatively, air bubbles may be taken into the nozzle N due to the ink attached to the edge of the nozzle N. In the example of FIG. 12, since the ink MK is attached to the edge of the nozzle N in the X1 direction, the ink droplet is ejected with a deviation in the X1 direction. FIG. 12 shows an ejection direction DI. The ejection direction DI is a direction in which the Z1 direction is rotated to the X1 direction with the direction along the Y axis as the central axis. When the ink droplets are ejected with a deviation, an ejection abnormality in which the ink droplets land on the recording paper PP with a deviation from the position where they should land occurs, and the quality of the image formed on the recording paper PP deteriorates. In addition, when air bubbles are taken into the nozzle N, there is a possibility that an ejection abnormality in which the ink is not ejected due to the air bubbles occurs.

Therefore, in the first embodiment, the amplitude of the residual vibration is ensured to the extent that the residual vibration can be accurately measured, and the length of the period TD1 of the expansion element DC1 of the detection waveform PS is set to be equal to or greater than the natural vibration cycle Tc. As a result, the meniscus MN is gradually pulled in the Z2 direction and vibrates inside the nozzle N, so that the meniscus MN can be prevented from protruding from the nozzle face FN in the Z1 direction, and it is possible to reduce the risk of the attachment of the ink to the edge of the nozzle N.

Figure 13:
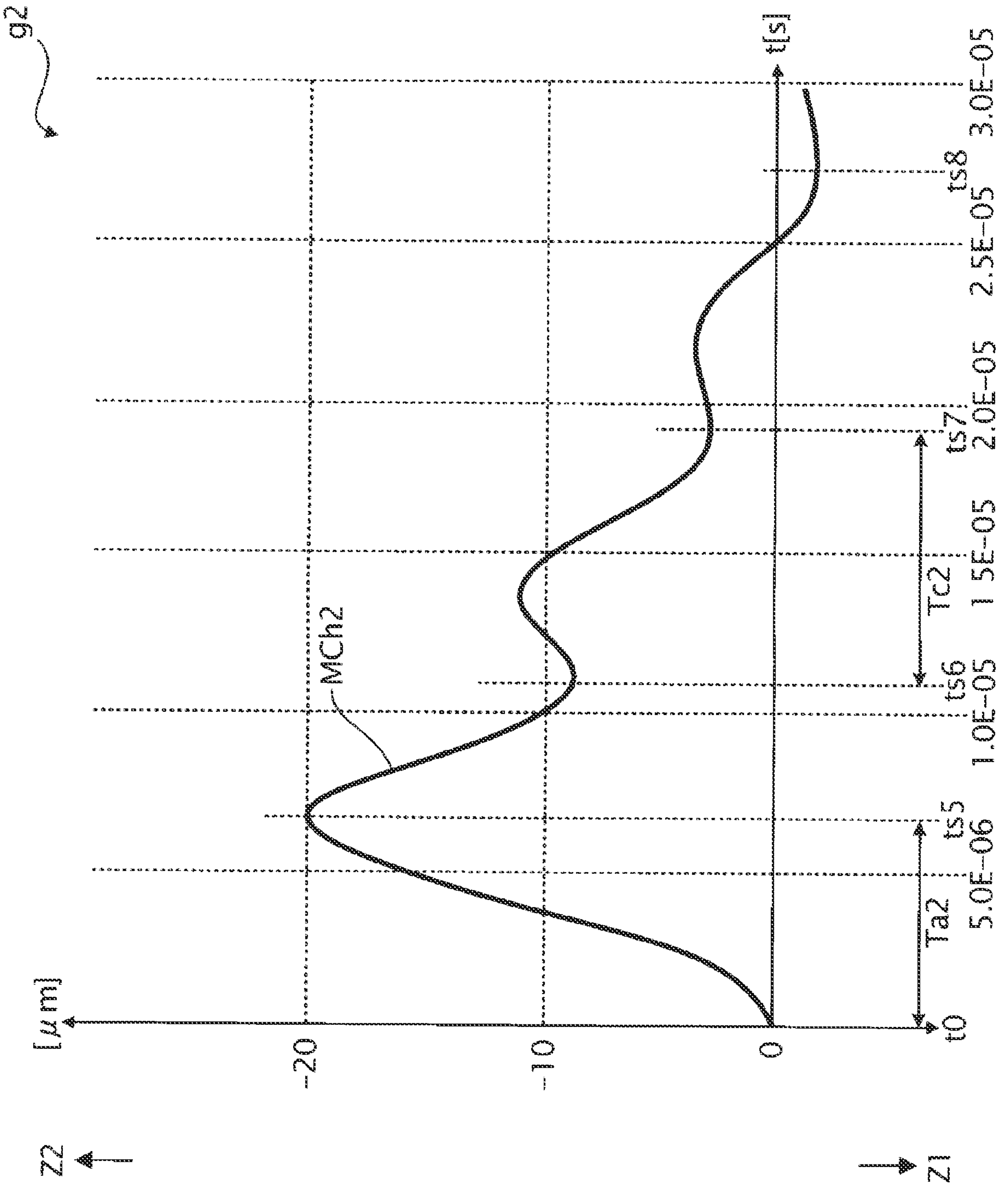
FIG. 13 is a diagram for explaining a vibration of the meniscus in the first embodiment.

FIG. 13 is a diagram for explaining the vibration of the meniscus MN in the first embodiment. The horizontal axis of the graph g2 shown in FIG. 13 indicates the elapsed period from start time t0 of the period TD1 of the expansion element DC1. The vertical axis of the graph g2 indicates the position of the meniscus MN.

A meniscus characteristic MCh2 shown in the graph g2 indicates the vibration characteristic of the meniscus MN in the first embodiment. As indicated by the meniscus characteristic MCh2, the meniscus MN is pulled in the Z2 direction during a period Ta2. The period Ta2 is a period from time t0 to time ts5. Time ts5 is approximately 6.8 microseconds. The position of the meniscus MN at time ts5 is a position about 20.0 [m] away from the nozzle face FN in the Z2 direction. As understood from the meniscus characteristics MCh2 and the meniscus characteristics MCh1, the pulled amount of the meniscus MN in the Z2 direction in the first embodiment is about twice the pulled amount shown in FIG. 10. This is because the potential difference ΔVs that is the width of a change in potential of the expansion element DC1 of the detection waveform PS indicating the meniscus characteristic MCh2 is larger than the potential difference that is the width of a change in potential of the expansion element of the inspection waveform indicating the meniscus characteristic MCh1. While the meniscus MN protrudes in the Z1 direction from the nozzle face FN at time ts2 two cycles after time t0 in the meniscus characteristic MCh1, the position of the meniscus MN at time ts7 two cycles after time t0 is located away from the nozzle face FN in the Z2 direction in the meniscus characteristic MCh2. As will be described later with reference to FIG. 14, this is because the length of the period TD1 of the expansion element DC1 of the detection waveform PS indicating the meniscus characteristic MCh2 is set to be greater than that of the natural vibration cycle Tc. Furthermore, as will be described later in detail with reference to FIG. 15, by setting the length of the period TD1 to be greater than the length of the natural vibration cycle TC, it is possible to adjust the magnitude of the amplitude of the residual vibration to the extent necessary for measuring the residual vibration. As described above, in the ink jet printer 1 according to the first embodiment, it is possible to suppress the occurrence of an ejection abnormality after the residual vibration without degrading the measurement accuracy of the residual vibration, compared with the mode in which the length of the period TD1 is shorter than that of the natural vibration cycle Tc.

After the elapse of the period Ta2, the meniscus MN protrudes in the Z1 direction due to the recoil from the position at which the meniscus MN is pulled in the Z2 direction. As indicated by the meniscus characteristic MCh2, the meniscus MN attenuates while vibrating according to the natural vibration cycle Tc. For example, the length of a period Tc2 from time ts6 one cycle after time t0 to time ts7 two cycles after time t0 is substantially the same as the length of the natural vibration cycle Tc. The position of the meniscus MN at time ts6 is a position about 8.5 [μm] away from the nozzle face FN in the Z2 direction. The position of the meniscus MN at time ts7 is a position about 2.9 [μm] away from the nozzle face FN in the Z2 direction. The position of the meniscus MN at time ts8, three cycles after time t0, is a position about 1.5 [μm] away from the nozzle face FN in the Z1 direction. As indicated by the meniscus characteristic MCh2, the meniscus MN at time ts8 is in a state in which the meniscus MN protrudes most in the Z1 direction relative to the nozzle face FN.

As indicated by the meniscus characteristic MCh2, the meniscus MN does not protrude from the nozzle face FN in the Z1 direction from time t0 to time ts7 after a period about twice the natural vibration cycle Tc has elapsed. Therefore, in the first embodiment, the meniscus MN vibrates inside the nozzle N and does not protrude outside the nozzle N until a period twice the natural vibration cycle Tc has elapsed since the end of the expansion element DC1.

Figure 14:
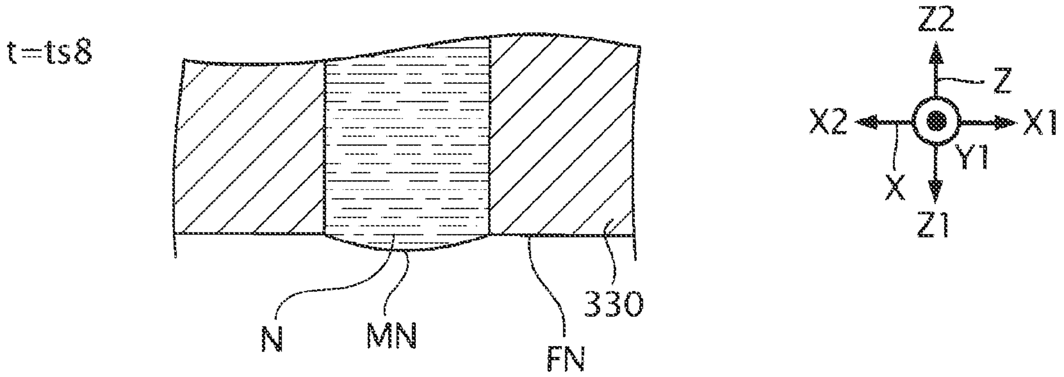
FIG. 14 is a diagram showing the state of the meniscus at time ts8.

FIG. 14 is a diagram showing the state of the meniscus MN at time ts8. As shown in FIG. 14, the meniscus MN at time ts8 protrudes in the Z1 direction from the nozzle face FN. However, as can be understood from the meniscus characteristic MCh1 and the meniscus characteristic MCh2, the amount by which the meniscus MN at time ts8 protrudes in the Z1 direction from the nozzle face FN is smaller the amount by which the meniscus MN at time ts3 protrudes in the Z1 direction from the nozzle face FN. Therefore, the ink jet printer 1 according to the first embodiment can reduce the attachment of the ink to the edge of the nozzle N, compared with the mode in which the length of the period TD1 is shorter than that of the natural vibration cycle Tc.

1-5. Detection Waveform PS

Figure 15:
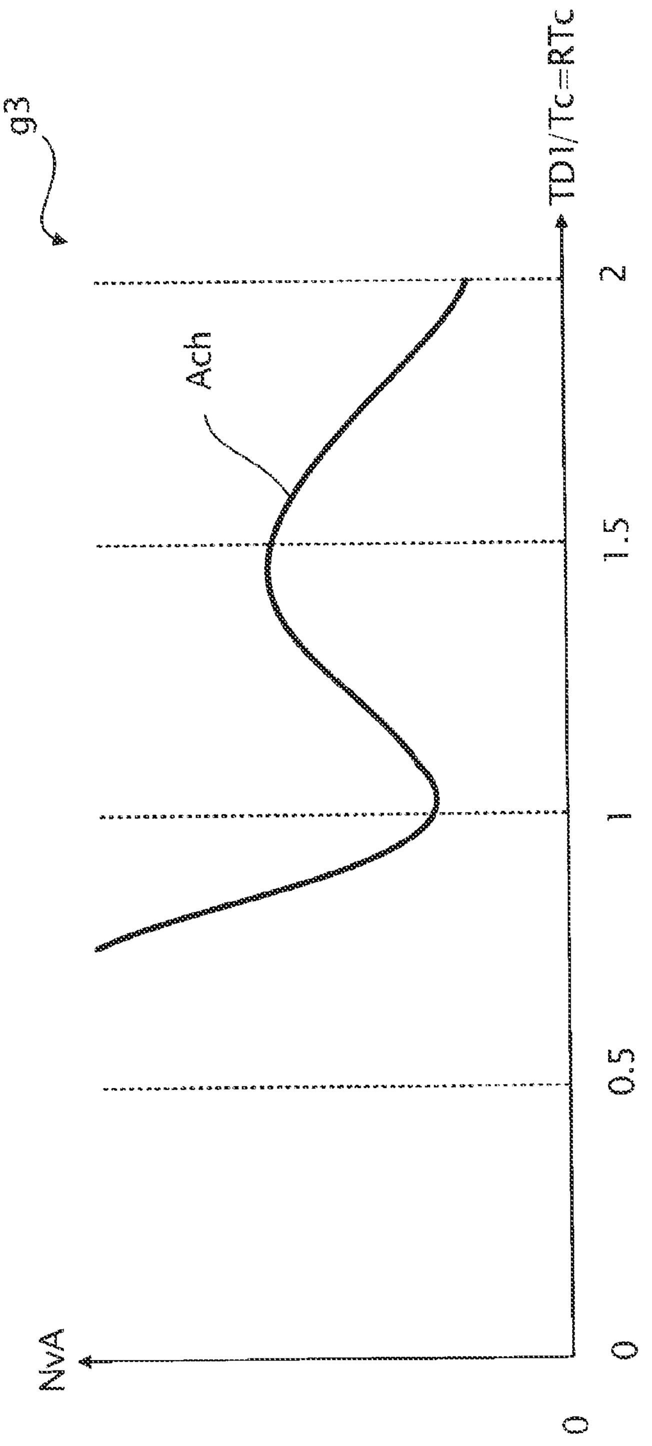
FIG. 15 is a diagram for explaining characteristics of an amplitude of a residual vibration.

FIG. 15 is a diagram for explaining the amplitude characteristics of the residual vibration. The horizontal axis of a graph g3 shown in FIG. 15 indicates the value obtained by dividing the length of the period TD1 by the length of the natural vibration cycle Tc. Hereinafter, the value obtained by dividing the length of the period TD1 by the length of the natural vibration cycle Tc may be referred to as a natural vibration cycle ratio RTc. The vertical axis of the graph g3 indicates the amplitude magnitude NvA of the residual vibration.

As shown by an amplitude characteristic Ach in the graph g3, when the natural vibration cycle ratio RTc is less than one, the amplitude magnitude NvA of the residual vibration decreases as the natural vibration cycle ratio RTc approaches one. When the natural vibration cycle ratio RTc is near one, the amplitude magnitude NvA of the residual vibration is minimal, and as the natural vibration cycle ratio RTc approaches 1.5, the amplitude magnitude NvA of the residual vibration increases. When the natural vibration cycle ratio RTc is near 1.5, the amplitude magnitude NvA of the residual vibration is maximum, and as the natural vibration cycle ratio RTc approaches two, the amplitude magnitude NvA of the residual vibration decreases. Although not shown, when the natural vibration cycle ratio RTc is greater than two, the amplitude magnitude NvA of the residual vibration increases as the natural vibration cycle ratio RTc approaches 2.5.

Figure 16:
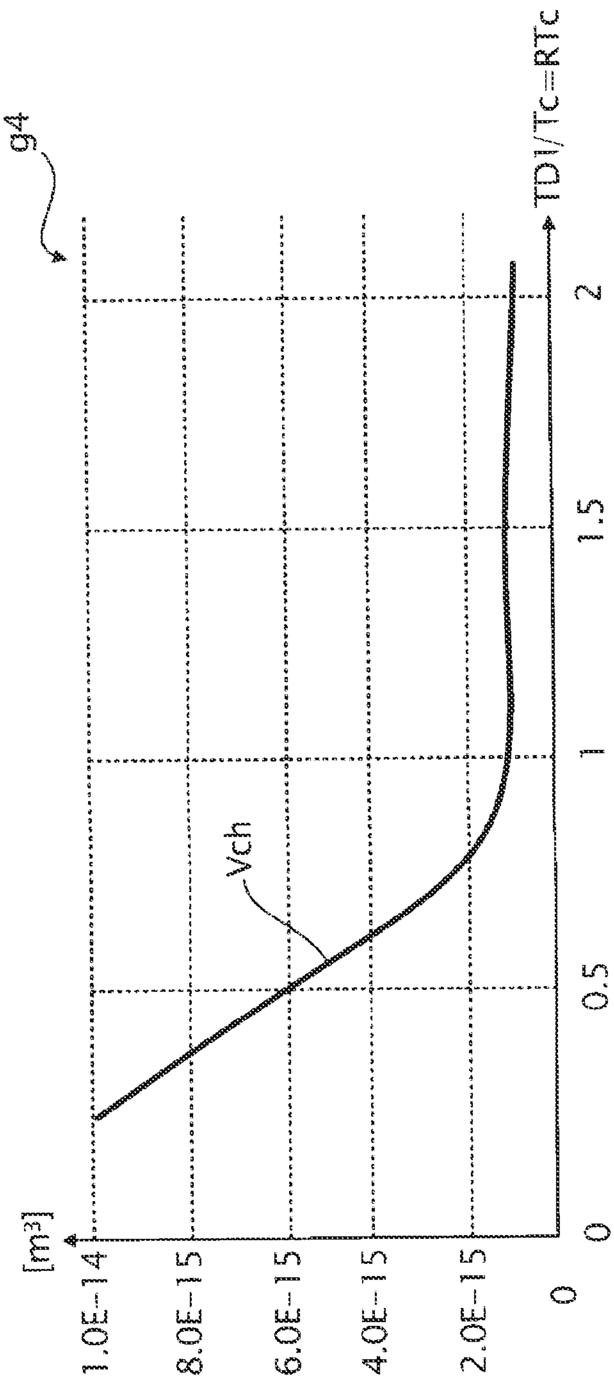
FIG. 16 is diagram for explaining characteristics of the amount of protrusion of the meniscus.

FIG. 16 is a diagram for explaining characteristics of the amount of protrusion of the meniscus MN. The horizontal axis of a graph g4 shown in FIG. 16 indicates the natural vibration cycle ratio RTc. The vertical axis of the graph g4 indicates the volume of the ink protruding from the nozzle face FN when the meniscus MN protrudes most in the Z1 direction. Hereinafter, the ink that protrudes from the nozzle face FN when the meniscus MN protrudes most in the Z1 direction may be referred to as "protruding ink". As the volume of the protruding ink is reduced, the possibility that the ink is attached to the edge of nozzle N is reduced.

As indicated by a volume characteristic Vch in the graph g4, when the natural vibration cycle ratio RTc is less than one, the volume of the protruding ink decreases as the natural vibration cycle ratio RTc approaches one. When the natural vibration cycle ratio RTc is near one, the volume of the protruding ink is approximately $1.0\times10^{-15}$ [$m^3$][$m^3$] means cubic meters. As indicated by the volume characteristic Vch, when the natural vibration cycle ratio RTc is equal to or greater than one, the volume of the protruding ink does not vary greatly.

Since the smaller the volume of the protruding ink, the smaller the possibility that the ink is attached to the edge of the nozzle N, as understood from the volume characteristic Vch, the natural vibration cycle ratio RTc is equal to or greater than one, in other words, the length of the period TD1 is equal to or greater than the length of the natural vibration cycle Tc. However, when the length of the period TD1 is greater than necessary, the length of the period of the detection waveform PS is longer to increase the period required to perform the ejection information generation process, which is not preferable. Therefore, it is preferable that the natural vibration cycle ratio RTc is equal to or less than two, in other words, the length of the period TD1 is equal to or less than twice the length of the natural vibration cycle Tc.

Furthermore, since the measurement accuracy of the residual vibration can be improved as the magnitude of the amplitude of the residual vibration increases, as understood from the amplitude characteristic Ach, the closer the natural vibration cycle ratio RTc is to 1.5, the better. For example, it is preferable that the natural vibration cycle ratio RTc is 1.3 to 1.7, in other words, the length of the period TD1 is 1.3 to 1.7 times the length of the natural vibration cycle Tc.

Furthermore, in order to increase the magnitude of the amplitude of the residual vibration, it is preferable that the potential difference ΔVs between the intermediate potential V0 that is the initial potential of the expansion element DC1 and the expansion potential VLS that is the final potential of the expansion element DC1 is large. Specifically, the potential difference ΔVs is preferably equal to or greater than the potential difference ΔVh. The potential difference ΔVs is an example of a "potential difference between the first potential and the second potential". The potential difference ΔVh is an example of a "potential difference between the fourth potential and the fifth potential".

Also, the detection circuit 20 acquires the detection signal Vout within the control period TSS2. In order to measure the amplitude of the residual vibration, the cycle of the residual vibration, and the damping ratio of the residual vibration, it is preferable to measure the residual vibration for two cycles or more. Since the cycle of the residual vibration is synchronized with the natural vibration cycle Tc, the length of the control period TSS2 is preferably equal to or greater than twice the natural vibration cycle Tc.

Further, the restoring element DC3 is intended to shrink and restore the volume of the pressure chamber 320 to the original volume without ejecting the ink from the nozzle N. Therefore, by lengthening the length of the period TD3 of the restoring element DC3, breakage of the meniscus MN is suppressed, and thus leakage of the ink from the nozzle N can be suppressed. For example, the amount of change in potential per unit period from the expansion potential VLS to the intermediate potential V0 of the restoring element DC3 is smaller than the amount of change in potential per unit period from the expansion potential VLS to the intermediate potential V0 of the expansion element DC1. In other words, the change in potential of the expansion element DC1 is steeper than the change in potential of the restoring element DC3. Furthermore, in the first embodiment, since the potential difference displaced by the expansion element DC1 and the potential difference displaced by the restoring element DC3 are the same potential difference, it can be said that the length of the period TD3 of the restoring element DC3 is greater than the length of the period TD1 of the expansion element DC1. The unit period is, for example, a period shorter than the period TD1 of the expansion element DC1 and the period TD3 of the restoring element DC3.

Considering the pressure resistance of the meniscus MN, the length of the period TD3 preferably satisfies Expression (1).

$$\text{Length of period } TD3 > \text{Viscosity resistance at the ink supply port } 360 \times \text{restoring capacity of pressure chamber } 320 / \text{Pressure resistance of meniscus } MN \quad (1)$$

The unit of viscosity resistance at the ink supply port 360 is Pascal second/cubic meter. The unit for the restoring capacity of the pressure chamber 320 is cubic meters. The unit of the pressure resistance of the meniscus MN is Pascal. A pressure resistance P1 of the meniscus MN is obtained, for example, by the following Equation (2).

$$P1=N1/(\pi D) \quad (2)$$

where N1 is a surface tension of the ink, π is the circular constant, and D is a diameter of the nozzle N. The viscosity resistance at the ink supply port 360, the restoring capacity of the pressure chamber 320, and the pressure resistance of the meniscus MN are values determined when the ink jet printer 1 is designed. The manufacturer of the ink jet printer 1 sets the length of the period TD3 so as to satisfy Expression (1) based on the viscosity resistance at the ink supply port 360, the restoring capacity of the pressure chamber 320, and the pressure resistance of the meniscus MN.

1-6. Ejection Information Stt

The generation circuit 9 generates the ejection information Stt based on the residual vibration signal NES to output the ejection information Stt to the controller 6. The controller 6 estimates the ink viscosity based on the ejection information Stt. For example, when the estimated viscosity of the ink is equal to or greater than a threshold value, the controller 6 determines that thickening of the ink is in progress, and causes the ejection unit D to forcibly eject the ink that does not directly contribute to image formation from to perform a flushing operation. The ink that does not directly contribute to image formation refers to ink that does not constitute the image itself formed on the recording paper PP by the printing operation. An ejection abnormality may be resolved by performing the flushing operation. As a result of resolving the ejection abnormality, it is possible to suppress the deterioration of the quality of the image formed on the recording paper PP.

1-7. Summary of First Embodiment

As described above, the ink jet printer 1 according to the first embodiment includes the ejection unit D including the nozzle N from which ink is ejected, the pressure chambers 320 communicating with the nozzle N, and the piezoelectric element PZ that applies pressure fluctuations to the ink in the pressure chamber 320 according to the supplied drive signal Com, the drive signal generation circuit 2 that generates the drive signal Com, and the detection circuit 20 that detects a residual vibration generated inside the pressure chamber 320 after the piezoelectric element PZ applies pressure fluctuations to the ink in the pressure chamber 320, wherein the drive signal generation circuit 2 generates the drive signal Com-B having the detection waveform PS including the expansion element DC1 that changes in potential from the intermediate potential V0 to the expansion potential VLS to expand the pressure chamber 320 and the expansion potential maintaining element DC2, following the expansion element DC1, that maintains the expansion potential VLS, wherein the length of the period TD1 from the start to the end of a change in potential from the intermediate potential V0 to the expansion potential VLS is equal to or greater than the length of the natural vibration cycle Tc of the ejection unit D, and wherein the detection circuit 20 detects the residual vibration generated in the pressure chamber 320 during the control period TSS2 included in the period TD2 of the expansion potential maintaining element DC2. By setting the length of the period TD1 to be equal to or greater than the length of the natural vibration cycle Tc, the measurement accuracy of the residual vibration can be maintained, and the possibility that the ink is attached to the edge of the nozzle N after the residual vibration occurs can be reduced, compared with the mode in which the length of the period TD1 is less than the length of the natural vibration cycle Tc. In the ink jet printer 1 according to the first embodiment, the possibility that the ink is attached to the edge of the nozzle N and the possibility of air bubbles being taken into the nozzle N are reduced, so that the possibility that the ejection abnormality occurs after the residual vibration can be reduced.

Moreover, the length of the period TD1 from the start to the end of the change in potential from the intermediate potential V0 to the expansion potential VLS is equal to or less than twice the length of the natural vibration cycle Tc. Since the length of the period TD1 is equal to or less than twice the natural vibration cycle Tc, it is possible to prevent the period of the detection waveform PS from being longer than necessary while suppressing the deviation of the ejection direction, compared with the mode in which the length of the period TD1 is greater than twice the length the natural vibration cycle Tc.

Further, the length of the period TD1 from the start to the end of the change in potential from the intermediate potential V0 to the expansion potential VLS is from 1.3 times the length of the natural vibration cycle Tc to 1.7 times the length of the natural vibration cycle Tc. The ink jet printer 1 according to the first embodiment can have an amplitude of the residual vibration larger than an amplitude in the mode in which the length of the period TD1 is less than 1.3 times the length of the natural vibration cycle Tc and the mode in which the length of the period TD1 is greater than 1.7 times the length of the natural vibration cycle Tc, so that it is possible to accurately measure the residual vibration.

The drive signal generation circuit 2 generates the drive signal Com-A having the ejection waveform PX that changes in potential between the highest potential VHX and the lowest potential VLX and causes the nozzle N to eject the ink, and the potential difference ΔVs between the intermediate potential V0 and the expansion potential VLS is equal to or greater than the potential difference ΔVh between the highest potential VHX and the lowest potential VLX. The ink jet printer 1 according to the first embodiment can have an amplitude of the residual vibration larger than an amplitude in the mode in which the potential difference ΔVs is less than the potential difference ΔVh.

The length of the control period TSS2 is equal to or greater than twice the length of the natural vibration cycle Tc. The cycle of the residual vibration corresponds to the natural vibration cycle Tc, so that when the length of the control period TSS2 is equal to or greater than twice the length of the natural vibration cycle Tc, the detection circuit 20 can acquire the potential of the individual electrode Qd indicating the residual vibration for two cycles or more. By acquiring the potential of the individual electrode Qd indicating the residual vibration for two cycles or more, the amplitude of the residual vibration, the cycle of the residual vibration, and the damping ratio of the residual vibration are accurately measured, compared with the mode of acquiring the potential of the individual electrode Qd for one cycle.

Further, the detection waveform PS further includes the restoring element DC3 that changes in potential from the expansion potential VLS to the intermediate potential V0 following the expansion potential maintaining element DC2, and the amount of change in potential per unit period from the expansion potential VLS to the intermediate potential V0 of the restoring element DC3 is smaller than the amount of change in potential per unit period from the intermediate potential V0 to the expansion potential VLS of the expansion element DC1. The ink jet printer 1 according to the first embodiment suppresses breakage of the meniscus MN, compared with the mode in which the amount of change in potential per unit period of the restoring element DC3 is larger than the amount of change in potential per unit period of the expansion element DC1, so that it is possible to suppress leakage of the ink from the nozzle N.

In addition, the length of the period TD3 from the start to the end of the change in potential from the expansion potential VLS to the intermediate potential V0 of the restoring element DC3 is larger than the value obtained by dividing the value obtained by multiplying the viscosity resistance at the ink supply port 360 through which the ink is supplied to the pressure chamber 320 by the restoring capacity of the pressure chamber 320 by the meniscus pressure resistance of the nozzle N. In other words, the length of the period TD3 satisfies Expression (1). The ink jet printer 1 according to the first embodiment suppresses breakage of the meniscus MN, compared with the mode in which the length of the period TD3 does not satisfy Expression (1), so that it is possible to suppress leakage of the ink from the nozzle N.

Further, in the first embodiment, in the driving method, after the expansion element DC1 is supplied the piezoelectric element PZ, the meniscus MN vibrates according to the natural vibration cycle Tc of the ejection unit D, and wherein the meniscus MN vibrates in the nozzle N until a period twice the natural vibration cycle Tc elapses since the end of the expansion element DC1. In other words, the meniscus MN does not protrude from the nozzle face FN until a period twice the natural vibration cycle Tc has passed since the end of the expansion element DC1. The meniscus MN does not protrude from the nozzle face FN until a period twice the natural vibration cycle Tc elapses since the end of the expansion element DC1, so that the possibility that the ink is attached to the edge of the nozzle N can be reduced, compared with the mode in which the meniscus MN protrudes from the nozzle face FN in the period twice the natural vibration cycle Tc from the end of the expansion element DC1.

2. Modifications

Each form illustrated above can be variously modified. Specific modifications are exemplified below. Two or more embodiments arbitrarily selected from the following examples can be appropriately merged to the extent that they do not contradict each other.

2-1. First Modification

In the first embodiment, both the initial potential of the expansion element DC1 and the final potential of the restoring element DC3 are the intermediate potential V0, but the present disclosure is not limited to this. For example, the initial potential of the expansion element DC1 and the final potential of the restoring element DC3 may be different potentials.

Figure 17:
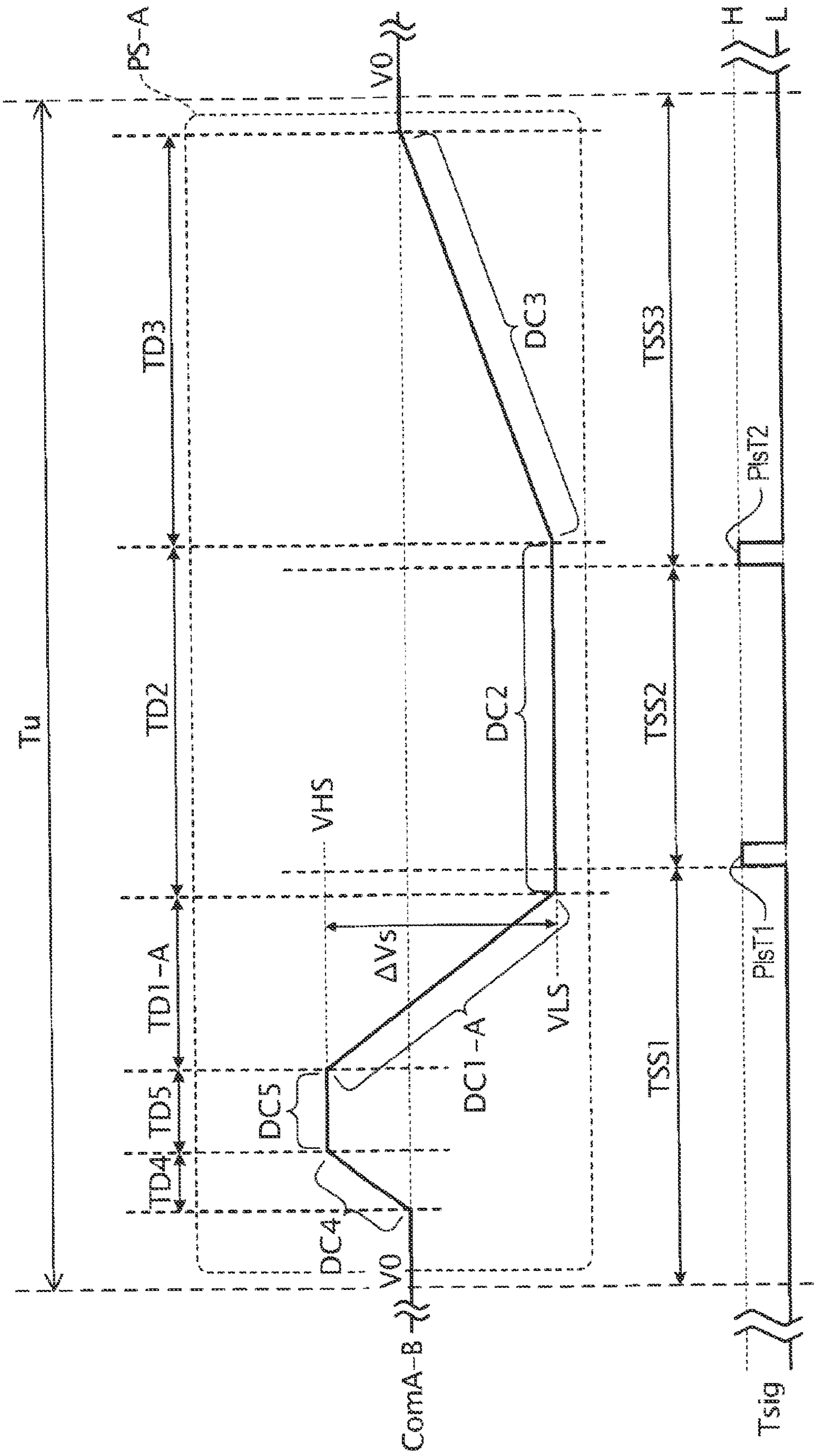
FIG. 17 is a diagram for explaining a drive signal ComA-B in the first modification.

FIG. 17 is a diagram for explaining a drive signal ComA-B in the first modification. The drive signal generation circuit 2 according to the first modification differs from the drive signal generation circuit 2 according to the first embodiment in that the drive signal ComA-B is generated instead of the drive signal Com-B. The drive signal ComA-B differs from the drive signal Com-B in that it has a detection waveform PS-A instead of the detection waveform PS.

The detection waveform PS-A differs from the detection waveform PS in that it has an expansion element DC1-A instead of the expansion element DC1, a contraction element DC4, and a contraction potential maintaining element DC5. The contraction element DC4 is an element that causes the pressure chamber 320 to contract by changing in potential from the intermediate potential V0 to a contraction potential VHS. The contraction potential maintaining element DC5 is an element that maintains the contraction potential VHS following the contraction element DC4. An expansion element DC1-A is an element that expands the pressure chamber 320 by changing in potential from the contraction potential VHS to the expansion potential VLS following the contraction potential maintaining element DC5. Note that in the first modification, the contraction potential VHS is an example of a "first potential", and the intermediate potential V0 is an example of a "third potential".

Further, as shown in FIG. 17, the control period TSS1 includes a period TD4 of the contraction element DC4, a period TD5 of the contraction potential maintaining element DC5, and a period TD1-A of the expansion element DC1-A.

In the first embodiment, when the intermediate potential V0 is close to the lower limit potential of the range of potentials that the piezoelectric element PZ can have, the expansion element DC1 cannot sufficiently expand the pressure chamber 320, and the amplitude of the residual vibration may not be sufficiently secured. On the other hand, in the first modification, even when the intermediate potential V0 is close to the lower limit potential, the pressure chamber 320 is first contracted by the contraction element DC4 and then expanded by the expansion element DC1-A, so that the amplitude of the residual vibration can be sufficiently secured.

2-2. Second Modification

In the first embodiment, the initial potential of the expansion element DC1 and the final potential of the restoring element DC3 are the same potential. In the first modification, the initial potential of the expansion element DC1 may be higher than the final potential of the restoring element DC3, or the initial potential of the expansion element DC1 may be lower than the final potential of the restoring element DC3.

2-3. Third Modification

In each aspect described above, the length of the period TD1 is preferably equal to or less than twice the natural vibration cycle Tc, and more preferably 1.3 to 1.7 times the natural vibration cycle Tc, but the length of TD1 may be greater than twice the natural vibration cycle Tc.

2-4. Fourth Modification

In each aspect described above, the potential difference ΔVs from the expansion potential VLS to the intermediate potential V0 is greater than the potential difference ΔVh from the lowest potential VLX to the highest potential VHX, but the potential difference ΔVs may be the same as the potential difference ΔVh, or the potential difference ΔVs may be smaller than the potential difference ΔVh.

2-5. Fifth Modification

In each aspect described above, the control period TSS2 is preferably equal to or greater than twice the length of the natural vibration cycle Tc, but may be less than twice the length of the natural vibration cycle Tc.

2-6. Sixth Modification

In the first embodiment, the amount of change in potential per unit period from the expansion potential VLS to the intermediate potential V0 of the restoring element DC3 is smaller than the amount of change in potential per unit period from the intermediate potential V0 to the expansion potential VLS of the expansion element DC1, but the present disclosure is not limited to this. The amount of change in potential per unit period from the expansion potential VLS to the intermediate potential V0 of the restoring element DC3 may be greater than the amount of change in potential per unit period from the intermediate potential V0 to the expansion potential VLS of the expansion element DC1.

2-7. Seventh Modification

In each aspect described above, the length of the period TD3 of the restoring element DC3 satisfies Expression (1), but does not have to satisfy Expression (1).

2-8. Eighth Modification

In each aspect described above, the detection waveform PS has the restoring element DC3 following the expansion potential maintaining element DC2, but may have an expansion element between the expansion potential maintaining element DC2 and the restoring element DC3.

2-9. Ninth Modification

In each aspect described above, it is assumed that the drive signal Com includes the drive signal Com-A and the drive signal Com-B, but the present disclosure is not limited to this. The drive signal generation circuit 2 generates one drive signal Com. The drive signal generation circuit 2 according to the ninth modification generates the drive signal Com including both the ejection waveform PX and the detection waveform PS in one unit control period Tu. The controller 6 outputs, to the switching circuit 10, a change signal CH for dividing one unit control period Tu into a period having the ejection waveform PX and a period having the detection waveform PS. Further, the controller 6 outputs, to the switching circuit 10, the print signal SI that designates to the ejection unit D whether to supply the ejection waveform PX or the detection waveform PS. The switching circuit 10 supplies the ejection waveform PX or the detection waveform PS to the ejection unit D based on the change signal CH and the print signal SI.

2-10. Tenth Modification

In each of the above aspects, the serial ink jet printer 1 in which the liquid ejection head HU reciprocates along the X axis is exemplified, but the present disclosure is not limited to this. The ink jet printer 1 may be a line-type liquid ejection apparatus in which a plurality of nozzles N is distributed over the entire width of the recording paper PP.

2-11. Other Modifications

The liquid ejection apparatus described above can be employed in various types of equipment such as facsimile machines and copiers, in addition to a device dedicated to printing. Further, the application of the liquid ejection apparatus of the present disclosure is not limited to printing. For example, a liquid ejection apparatus that ejects a solution of a color material is used as a manufacturing device that forms a color filter for a liquid crystal display device. Further, a liquid ejection apparatus that ejects a solution of a conductive material is used as a manufacturing device that forms wiring on a wiring substrate and electrodes.

3. Supplementary Note

For example, the following configurations can be grasped from the embodiments exemplified above.

A liquid ejection apparatus according to a first aspect that is a preferred aspect includes an ejection unit including a nozzle from which a liquid is ejected, a pressure chamber communicating with the nozzle, and a piezoelectric element that applies pressure fluctuations to a liquid in the pressure chamber according to a supplied drive signal, a drive signal generation unit that generates the drive signal, and a detection unit that detects a residual vibration generated in the pressure chamber after the piezoelectric element applies pressure fluctuations to the liquid in the pressure chamber, wherein the drive signal generation unit generates the drive signal having a detection waveform including an expansion element that changes in potential from a first potential to a second potential to expand the pressure chamber, and an expansion potential maintaining element that maintains the second potential following the expansion element, wherein a length of a period from a start to an end of a change in potential from the first potential to the second potential is equal to or greater than a length of a natural vibration cycle of the ejection unit, and wherein the detection unit detects a residual vibration generated in the pressure chamber during a detection period included in a period of the expansion potential maintaining element. By setting the length of the period from the start to the end of the change in potential from the first potential to the second potential to be equal to or greater than the length of the natural vibration cycle, it is possible to reduce the possibility that the liquid is attached to the edge of the nozzle after the residual vibration occurs while maintaining the measurement accuracy of the residual vibration, compared with the mode in which the length of the aforementioned period is less than the length of the natural vibration cycle. In the liquid ejection apparatus according to the first aspect, the possibility that the liquid is attached to the edge of the nozzle and the possibility that air bubbles are taken into the nozzle are reduced, so that it is possible to reduce the possibility that the ejection abnormality may occur after the residual vibration occurs.

In a second aspect that is a specific example of the first aspect, the length of the period from the start to the end of the change in potential from the first potential to the second potential is equal to or less than twice the length of the natural vibration cycle. In the liquid ejection apparatus according to the second aspect, the length of the period from the start to the end of the change in potential from the first potential to the second potential is equal to or less than twice that of the natural vibration cycle, so that it is possible to prevent the period of the detection waveform from being longer than necessary while suppressing the deviation of the ejection direction, compared with the mode in which the length is greater than twice the natural vibration cycle.

In a third aspect that is a specific example of the first aspect, the length of the period from the start to the end of the change in potential from the first potential to the second potential is from 1.3 times the length of the natural vibration cycle to 1.7 times the length of the natural vibration cycle. The liquid ejection apparatus according to a third aspect can have an amplitude of the residual vibration larger than an amplitude in the mode in which the length of the period from the start to the end of the change in potential from the first potential to the second potential is less than 1.3 times the length of the natural vibration cycle and the mode in which the length of the period is greater than 1.7 times the length of the natural vibration cycle, so that it is possible to accurately measure the residual vibration.

In a fourth aspect that is a specific example of any one of the first to third aspects, the drive signal generation unit generates a drive signal having an ejection waveform that changes in potential between a fourth potential and a fifth potential to eject a liquid from the nozzle, and wherein a potential difference between the first potential and the second potential is equal to or greater than a potential difference between the fourth potential and the fifth potential. The liquid ejection apparatus according to the fourth aspect can have an amplitude of the residual vibration larger than an amplitude in the mode in which the potential difference between the first potential and the second potential is less than the potential difference between the fourth potential and the fifth potential.

In a fifth aspect that is a specific example of the fourth aspect, a length of the detection period is equal to or greater than twice the length of the natural vibration cycle. The cycle of the residual vibration corresponds to the natural vibration cycle, so that when the length of the detection period is equal to or greater than twice the length of the natural vibration cycle, the liquid ejection apparatus according to the fifth aspect can acquire the potential of the individual electrode indicating the residual vibration for two cycles or more. By acquiring the residual vibration for two or more cycles, the damping ratio of the residual vibration can be measured, and the amplitude of the residual vibration and the cycle of the residual vibration can be measured with higher accuracy, compared with the mode of acquiring the residual vibration for one cycle.

In a sixth aspect that is a specific example of the first aspect, the detection waveform further includes a restoring element that changes in potential from the second potential to a third potential following the expansion potential maintaining element, and wherein an amount of change in potential per unit period of the restoring element from the second potential to the third potential is smaller than an amount of change in potential per unit period of the expansion element from the first potential to the second potential. The liquid ejection apparatus according to the sixth aspect suppresses breakage of the meniscus, so that it is possible to suppress leakage of the ink from the nozzle, compared with the mode in which the amount of change in potential per unit period of the restoring element is larger than the amount of change in potential per unit period of the expansion element.

In the seventh aspect that is a specific example of the first aspect, a length of a period from a start to an end of a change in potential from the second potential to the third potential is larger than a value obtained by dividing a value obtained by multiplying a restoring capacity of the pressure chamber by a viscosity resistance at a supply port through which a liquid is supplied to the pressure chamber by a pressure resistance of a liquid surface of the nozzle. The liquid ejection apparatus according to the seventh aspect suppresses breakage of the liquid surface of the nozzle, compared with the mode in which the length of the period from the start to the end of the change in potential from the second potential to the third potential is less than or equal to a value obtained by dividing a value obtained by multiplying the viscosity resistance at the supply port by the restoring capacity of the pressure chamber by the pressure resistance of the liquid surface of the nozzle, so that it is possible to suppress leakage of the liquid from the nozzle.

In a method of driving a liquid ejection apparatus according to an eighth aspect that is a preferred aspect, the liquid ejection apparatus including an ejection unit including a nozzle from which a liquid is ejected, a pressure chamber communicating with the nozzle, and a piezoelectric element that applies pressure fluctuations to a liquid in the pressure chamber according to a supplied drive signal, a drive signal generation unit that generates the drive signal, and a detection unit that detects a residual vibration generated in the pressure chamber after the piezoelectric element applies pressure fluctuations to the liquid in the pressure chamber, the drive signal generation unit generates the drive signal having a detection waveform including an expansion element that changes in potential from a first potential to a second potential to expand the pressure chamber, and an expansion potential maintaining element that maintains the second potential following the expansion element, the detection unit detects a residual vibration generated in the pressure chamber during a detection period included in a period of the expansion potential maintaining element, wherein after the expansion element is supplied the piezoelectric element, a liquid surface in the nozzle vibrates according to a natural vibration cycle of the ejection unit, and the liquid surface in the nozzle vibrates in the nozzle until a period twice the natural vibration cycle elapses since an end of the expansion element. In the driving method according to the eighth mode, the liquid surface of the nozzle does not protrude from the nozzle until a period twice the natural vibration cycle has elapsed since the end of the expansion element, so that the possibility that the liquid is attached to the edge of the nozzle can be reduced compared with the mode in which the liquid surface of the nozzle protrudes from the nozzle in the period twice the natural vibration cycle from the end of the expansion element.

What is claimed is:

1. A liquid ejection apparatus comprising:

an ejection unit including a nozzle from which a liquid is ejected, a pressure chamber communicating with the nozzle, and a piezoelectric element that is configured to apply pressure fluctuations to a liquid in the pressure chamber according to a supplied drive signal;

a drive signal generation unit that is configured to generate the drive signal; and a detection unit that is configured to detect a residual vibration generated in the pressure chamber after the piezoelectric element applies pressure fluctuations to the liquid in the pressure chamber, wherein the drive signal generation unit generates the drive signal having a detection waveform including an expansion element that changes in potential for an entirety of a duration from a start to an end of the expansion element from a first potential to a second potential to expand the pressure chamber, and an expansion potential maintaining element that maintains the second potential following the expansion element, wherein a length of a period from the start to the end of the change in potential from the first potential to the second potential is equal to or greater than a length of a natural vibration cycle of the ejection unit, and wherein the detection unit detects a residual vibration generated in the pressure chamber during a detection period included in a period of the expansion potential maintaining element.

2. The liquid ejection apparatus according to claim 1, wherein the length of the period from the start to the end of the change in potential from the first potential to the second potential is equal to or less than twice the length of the natural vibration cycle.

3. The liquid ejection apparatus according to claim 1, wherein the length of the period from the start to the end of the change in potential from the first potential to the second potential is from 1.3 times the length of the natural vibration cycle to 1.7 times the length of the natural vibration cycle.

4. The liquid ejection apparatus according to claim 1, wherein the drive signal generation unit generates a drive signal having an ejection waveform that changes in potential between a fourth potential and a fifth potential to eject a liquid from the nozzle, and wherein a potential difference between the first potential and the second potential is equal to or greater than a potential difference between the fourth potential and the fifth potential.

5. The liquid ejection apparatus according to claim 4, wherein a length of the detection period is equal to or greater than twice the length of the natural vibration cycle.

6. The liquid ejection apparatus according to claim 1, wherein the detection waveform further includes a restoring element that changes in potential from the second potential to a third potential following the expansion potential maintaining element, and wherein an amount of change in potential per unit period of the restoring element from the second potential to the third potential is smaller than an amount of change in potential per unit period of the expansion element from the first potential to the second potential.

7. The liquid ejection apparatus according to claim 6, wherein a length of a period from a start to an end of a change in potential from the second potential to the third potential is larger than a value obtained by dividing a value obtained by multiplying a restoring capacity of the pressure chamber by a viscosity resistance at a supply port through which a liquid is supplied to the pressure chamber by a pressure resistance of a liquid surface of the nozzle.

8. The liquid ejection apparatus according to claim 1, the change in potential from the first potential to the second potential in the expansion element being linear.

9. A method of driving a liquid ejection apparatus including an ejection unit including a nozzle from which a liquid is ejected, a pressure chamber communicating with the nozzle, and a piezoelectric element that is configured to apply pressure fluctuations to a liquid in the pressure chamber according to a supplied drive signal, a drive signal generation unit that is configured to generate the drive signal, and a detection unit that is configured to detect a residual vibration generated in the pressure chamber after the piezoelectric element applies pressure fluctuations to the liquid in the pressure chamber, the method comprising:

generating the drive signal by the drive signal generation unit, the drive signal having a detection waveform including an expansion element that changes in potential for an entirety of a duration from a start to an end of the expansion element from a first potential to a second potential to expand the pressure chamber, and an expansion potential maintaining element that maintains the second potential following the expansion element; and detecting a residual vibration by the detection unit, the residual vibration being generated in the pressure chamber during a detection period included in a period of the expansion potential maintaining element, wherein after the expansion element is supplied the piezoelectric element, a liquid surface in the nozzle vibrates according to a natural vibration cycle of the ejection unit, and wherein the liquid surface in the nozzle vibrates in the nozzle until a period twice the natural vibration cycle elapses since an end of the expansion element.

10. The method according to claim 9, the change in potential from the first potential to the second potential in the expansion element being linear.

* * * * *